US009157749B2

(12) United States Patent
Aoki et al.

(10) Patent No.: US 9,157,749 B2
(45) Date of Patent: Oct. 13, 2015

(54) POSITION CALCULATION METHOD AND POSITION CALCULATION APPARATUS

(75) Inventors: Toshiyuki Aoki, Tokyo (JP); Mikio Bando, Tokyo (JP); Tomoaki Hiruta, Tokyo (JP); Hiroyuki Kohida, Zama (JP); Koichi Kato, Ageo (JP); Akihiro Kawabata, Koriyama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/111,117

(22) PCT Filed: Apr. 11, 2012

(86) PCT No.: PCT/JP2012/059876
§ 371 (c)(1),
(2), (4) Date: Oct. 25, 2013

(87) PCT Pub. No.: WO2012/141199
PCT Pub. Date: Oct. 18, 2012

(65) Prior Publication Data
US 2014/0067256 A1 Mar. 6, 2014

(30) Foreign Application Priority Data

Apr. 11, 2011 (JP) ................................. 2011-087237

(51) Int. Cl.
*G01C 21/30* (2006.01)
(52) U.S. Cl.
CPC ..................................... *G01C 21/30* (2013.01)
(58) Field of Classification Search
None
See application file for complete search history.

(56) References Cited

U.S. PATENT DOCUMENTS

| 6,931,319 B2 | 8/2005 | Adachi | |
|---|---|---|---|
| 8,041,472 B2 | 10/2011 | Kobori et al. | |
| 2004/0024565 A1* | 2/2004 | Yu et al. | 702/151 |
| 2007/0213933 A1* | 9/2007 | Zeng et al. | 701/220 |
| 2008/0071469 A1* | 3/2008 | Caveney | 701/207 |
| 2008/0228395 A1 | 9/2008 | Kobori et al. | |
| 2010/0324815 A1* | 12/2010 | Hiruta et al. | 701/208 |

FOREIGN PATENT DOCUMENTS

| CN | 101360971 A | 2/2009 |
|---|---|---|
| CN | 100489455 C | 5/2009 |
| EP | 1 256 781 A1 | 11/2002 |

(Continued)

OTHER PUBLICATIONS

Corresponding International Search Report with English Translation dated Jul. 24, 2012 (five (5) pages).

(Continued)

*Primary Examiner* — John R Olszewski
*Assistant Examiner* — Jess Whittington
(74) *Attorney, Agent, or Firm* — Crowell & Moring LLP

(57) ABSTRACT

A position calculation method includes: by using a current position of a mobile object, a link candidate point position, an error variance of positions of a plurality of links included in a region around the current position, and an error variance of azimuths of the plurality of links, calculating, an evaluation value that corresponds to a probability that the mobile object is traveling upon a road corresponding to each link candidate point, for each link including the each link candidate point; and calculating the current position based upon the evaluation value, by taking the mobile object as being positioned at a link candidate point, among a plurality of link candidate points, for which the probability is highest.

14 Claims, 17 Drawing Sheets

(56) References Cited

FOREIGN PATENT DOCUMENTS

| | | | |
|---|---|---|---|
| EP | 2 264 404 A2 | 12/2010 | |
| JP | H09-152343 * | 6/1997 | ............ G01C 21/00 |
| JP | 9-229698 A | 9/1997 | |
| JP | 2000-346663 A | 12/2000 | |
| JP | 2008-26282 A | 2/2008 | |
| JP | 2009-236517 A | 10/2009 | |
| JP | 2011-2324 A | 1/2011 | |
| WO | WO 94/20919 A1 | 9/1994 | |

OTHER PUBLICATIONS

European Search Report dated Sep. 19, 2014 (Four (4) pages).

Maan et al., "A Road-Matching Method for Precise Vehicle Localization Using Belief Theory and Kalman Filtering", Autonomous Robots, Kluwer Academic Publishers, BO, vol. 19, No. 2, Sep. 1, 2005, pp. 173-191 (Nineteen (19) pages).

* cited by examiner

FIG. 4
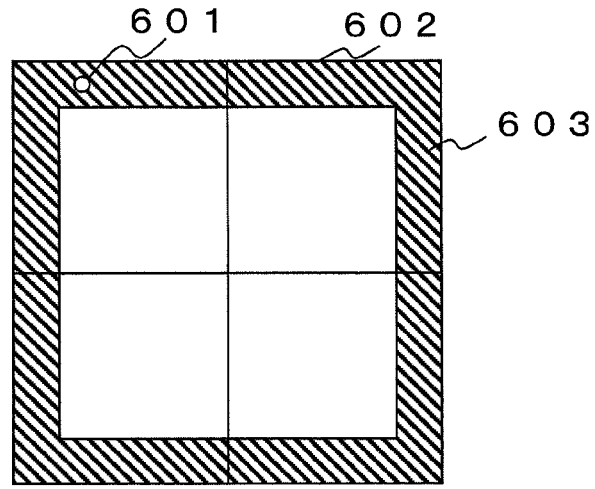
(a)
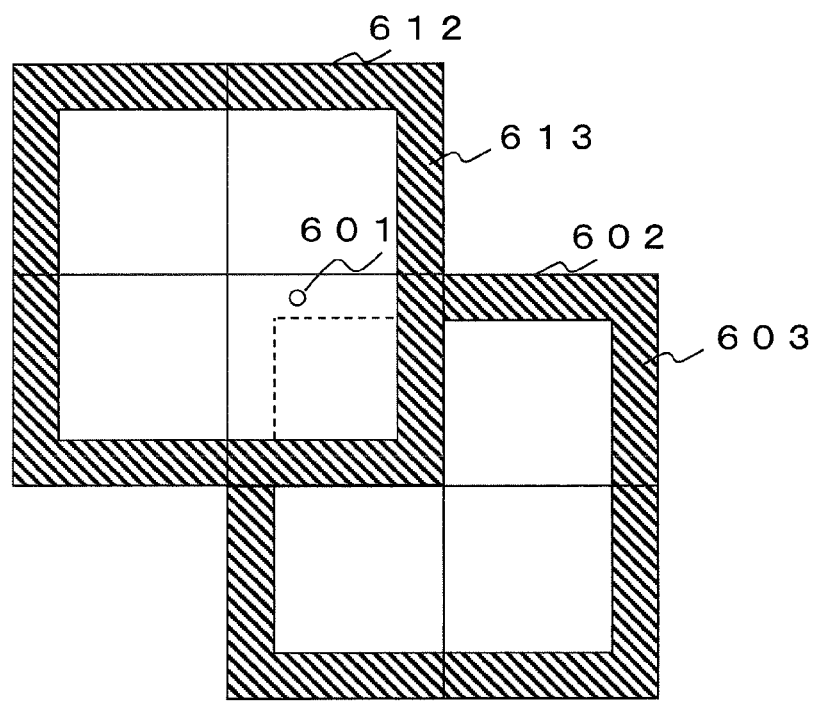
(b)

FIG. 9
FIG. 10
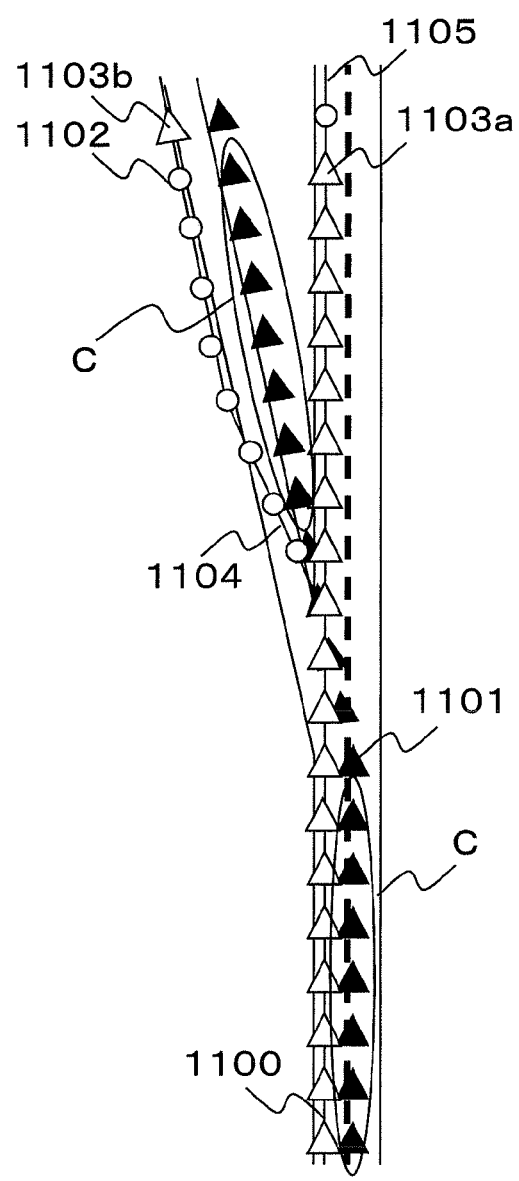
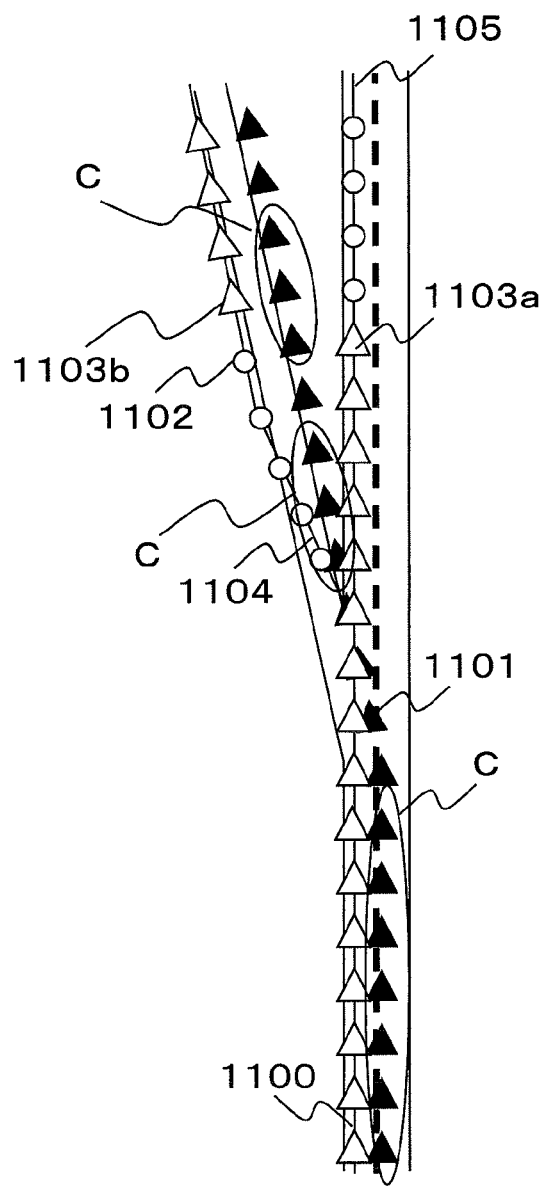

FIG. 12
FIG. 13
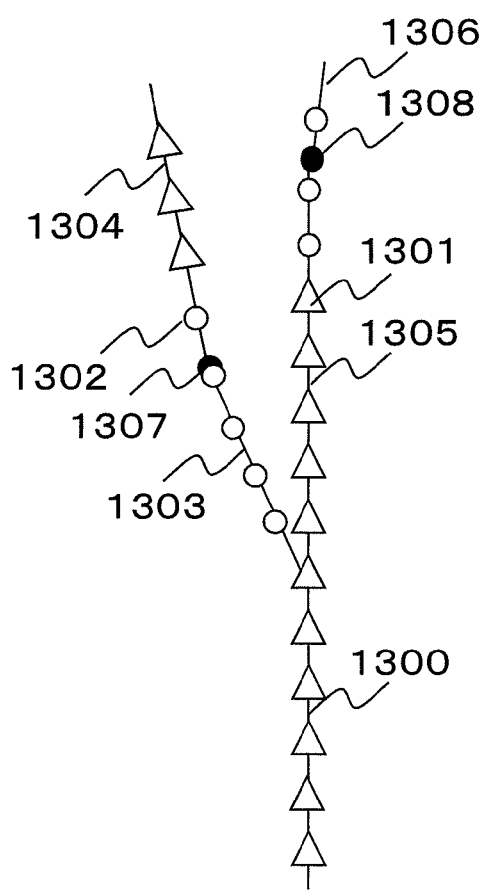
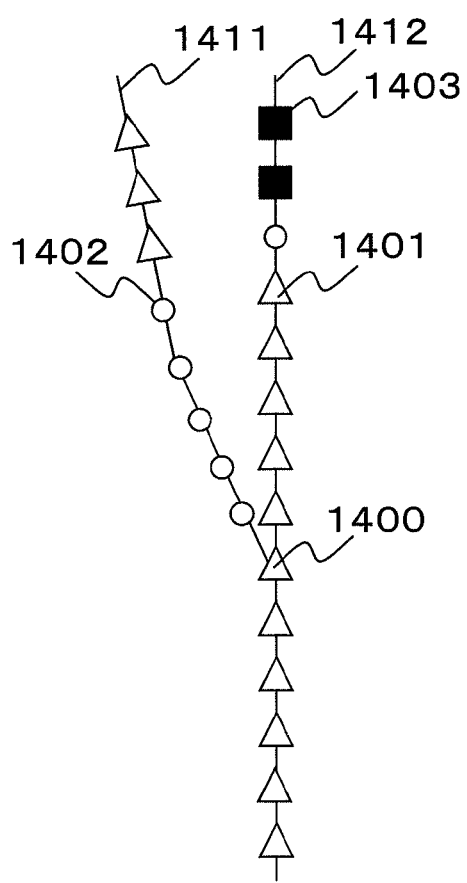

POSITION CALCULATION METHOD AND POSITION CALCULATION APPARATUS

TECHNICAL FIELD

The present invention relates to a position calculation method that calculates the position of a mobile object, and to a position calculation apparatus.

BACKGROUND ART

It is per se known to determine an estimated position for a vehicle, to calculate the limit error of the estimated position occurring due to error in the estimated position and error in the road map, to extract the links that are within the range of the limit error of the estimated position, to implement map matching to these links, and thus to calculate the position of the vehicle (refer to Patent Literature #1).

With this prior art technique of Patent Literature #1, by extracting the links while considering, not only error in the estimated position of the vehicle, but also error in the link data, it is possible to implement map matching to the links and also to determine whether the vehicle has deviated from a road, according to error in the estimated position of the vehicle and also error of the links.

CITATION LIST

Patent Literature

Patent Literature #1: Japanese Laid-Open Patent Publication H09-229698.

SUMMARY OF INVENTION

Technical Problem

Since it is not possible to deal with errors in the estimated position and the estimated azimuth of the vehicle due to the traveling route and the quality of reception of GPS signals and so on, or to deal with errors in the links, these errors being different for each region and for each map maker, accordingly mismatching to erroneous links can undesirably occur at roads that fork apart at narrow angles or due to parallel roads or the like that are links other than the link upon which the vehicle is traveling but near to it.

Solution to Technical Problem

According to the 1st aspect of the present invention, a position calculation method comprises: calculating a current position, a shifting speed and an azimuth of movement of a mobile object; calculating an estimated error covariance of the current position and the azimuth of movement based upon the current position, the shifting speed and the azimuth of movement; as a calculation using the current position, the azimuth of movement, the estimated error covariance, a link candidate point position of each link candidate point of a plurality of link candidate points included in a region around the current position, a link candidate point azimuth of the each link candidate point, a first error variance of positions of a plurality of links included in the region, and a second error variance of azimuths of the plurality of links, calculating, based upon a distance between the current position and the link candidate point position and based upon an azimuthal difference between the azimuth of movement and the link candidate point azimuth, by adding together a plurality of data items including the distance and the azimuthal difference obtained at each of predetermined intervals up to the link candidate point position, an evaluation value that corresponds to a probability that the mobile object is traveling upon a road corresponding to the each link candidate point, for each link including the each link candidate point; and calculating the current position based upon the evaluation value, by taking the mobile object as being positioned at a link candidate point, among the plurality of link candidate points, for which the probability is highest.

According to the 2nd aspect of the present invention, in the position calculation method according to the 1st aspect, it is preferred that the first error variance is calculated based upon the distance; the second error variance is calculated based upon the azimuthal difference; and the evaluation value is obtained by summing, over the plurality of data items, a sum of a value obtained by dividing a square of the distance included in each of the plurality of data items by a sum of the first error variance and an estimated error variance of the current position, and a value obtained by dividing a square of the azimuthal difference included in the each of the plurality of data items by a sum of the second error variance and an estimated error variance of the azimuth of movement.

According to the 3rd aspect of the present invention, in the position calculation method according to the 1st or the 2nd aspect, it is preferred that the position calculation method further comprises: making, based upon whether or not a first test statistic that is related to a distance between the current position and the link candidate point position for which the probability is the highest is greater than a first threshold value, a decision as to whether or not there is a difference between the current position and the link candidate point position; making, based upon whether or not a second test statistic that is related to an azimuthal difference between the azimuth of movement and the link candidate point azimuth for which the probability is the highest is greater than a second threshold value, a decision as to whether or not there is a difference between the azimuth of movement and the link candidate point azimuth; and, when there is a difference between the current position and the link candidate point position or when there is a difference between the azimuth of movement and the link candidate point azimuth, making a decision that the mobile object has deviated from the road corresponding to the link candidate point for which the probability is the highest, and, when there is no difference between the current position and the link candidate point position and there is no difference between the azimuth of movement and the link candidate point azimuth, making a decision that the mobile object is traveling upon the road corresponding to the link candidate point for which the probability is the highest. When it has been decided that the mobile object has deviated from the road corresponding to the link candidate point for which the probability is the highest, it is calculated that the mobile object is positioned at the current position, and, when it has been decided that the mobile object is traveling upon the road corresponding to the link candidate point for which the probability is the highest, the current position is calculated as the mobile object is positioned at the link candidate point.

According to the 4th aspect of the present invention, in the position calculation method according to the 3rd aspect, it is preferred that the position calculation method further comprises: when it has been decided that the mobile object has not deviated from the road corresponding to the link candidate point for which the probability is the highest, making a decision as to whether or not to calculate the first error variance, according as to whether or not the estimated error covariance is less than or equal to a third threshold value; and, when it has been decided that the mobile object has not deviated from the road corresponding to the link candidate point for which the probability is the highest, making a decision as to whether or not to calculate the second error variance, according as to whether or not the estimated error covariance is less than or equal to a fourth threshold value.

According to the 5th aspect of the present invention, in the position calculation method according to the 3rd aspect, it is preferred that the position calculation method further comprises: calculating a DOP value from a position of a position measurement satellite and the current position; and making a decision as to whether or not the current position is anomalous and as to whether or not the azimuth of movement is anomalous, based upon change in the current position, change in the shifting speed and change in the azimuth of movement. When it has been decided that the mobile object has not deviated from the road corresponding to the link candidate point for which the probability is the highest and it has been decided that the current position is not anomalous, the decision is made as to whether or not to calculate the first error variance, according as to whether or not the DOP value is less than or equal to a fifth threshold value; and when it has been decided that the mobile object has not deviated from the road corresponding to the link candidate point for which the probability is the highest, and it has been decided that the current position is not anomalous, the decision is made as to whether or not to calculate the second error variance, according as to whether or not the DOP value is less than or equal to the fifth threshold value.

According to the 6th aspect of the present invention, in the position calculation method according to any one of the 3rd through 5th aspects, it is preferred that the values of the first test statistic and the second test statistic are each a value that is obtained by making dimensionless and totaling a value that is obtained by dividing a square of the distance between the current position and the link candidate point position for which the probability is the highest by a sum of error covariances of the current position and of the link candidate point position for which the probability is the highest, and a value that is obtained by dividing a square of the azimuthal difference between the azimuth of movement and the link candidate point azimuth for which the probability is the highest by a sum of error variances of the azimuth of movement and of the link candidate point azimuth for which the probability is the highest.

According to the 7th aspect of the present invention, in the position calculation method according to any one of the 3rd through 6th aspects, it is preferred that the first test statistic is a value obtained by dividing a square of the distance between the current position and the link candidate point position for which the probability is the highest by a sum of error covariances of the current position and of the link candidate point position for which the probability is the highest; and the second test statistic is a value obtained by dividing a square of the azimuthal difference between the azimuth of movement and the link candidate point azimuth for which the probability is the highest by a sum of error variances of the azimuth of movement and the link candidate point azimuth for which the probability is the highest.

According to the 8th aspect of the present invention, in the position calculation method according to any one of the 1st through 7th aspects, it is preferred that, when a first link and a second link that constitute the plurality of links fork off from a road fork point node and the link candidate point for which the probability is the highest is included in the first link, a number of data items in the plurality of data items is reduced, from when the mobile object passes through an intersection that corresponds to the road fork point node until a gap between the link candidate point position of the link candidate point and a road section corresponding to the second link becomes greater than a predetermined value.

According to the 9th aspect of the present invention, in the position calculation method according to any one of the 1st through 7th aspects, it is preferred that a number of data items in the plurality of data items is reduced during a first interval from when the mobile object passes through an intersection that corresponds to a road fork point node from which a first link and a second link that constitute the plurality of links fork off, until it is decided that the mobile object is traveling along a road that corresponds to a link including a link candidate point that is different from the link candidate point for which the probability is the highest.

According to the 10th aspect of the present invention, in the position calculation method according to the 9th aspect, it is preferred that the position calculation method further comprises: if the mobile object is being guided along a guidance route from a start point link in neighborhood of the current position to an end point link in neighborhood of a destination for the mobile object and if a link that includes the link candidate point for which the probability is the highest is included in the guidance route, and it is decided that the mobile object has not deviated from the road and the distance between the intersection and the link candidate point position of the link candidate point has become less than or equal to a predetermined value, outputting a display for guidance and guidance audio related to the guidance route to a display and an audio output device; and, if the mobile object is being guided based upon the guidance route and if the link that includes the link candidate point for which the probability is the highest is not included in the guidance route, and if the mobile object passes through the intersection and it is decided that the mobile object has deviated from the road that corresponds to a link including a link candidate point that is different from the link candidate point for which the probability is the highest, searching a new guidance route from the start point link of the neighborhood of the current position to the end point link in the neighborhood of the destination for the mobile object.

According to the 11th aspect of the present invention, a position calculation apparatus comprises: a shifting information calculation unit that calculates a current position, a shifting speed and an azimuth of movement of a mobile object; an estimated error covariance calculation unit that calculates an estimated error covariance of the current position and the azimuth of movement based upon the current position, the shifting speed and the azimuth of movement; a probability calculation unit that calculates, as a calculation using the current position, the azimuth of movement, the estimated error covariance, a link candidate point position of each link candidate point of a plurality of link candidate points included in a predetermined region that includes the current position from the current position, a link candidate point azimuth of the each link candidate point, a first error variance of positions of the plurality of links included within the region and a second error variance of azimuths of the plurality of links, based upon a distance between the current position and the link candidate point position and based upon the azimuthal difference between the azimuth of movement and the link candidate point azimuth, by adding together a plurality of data items including the distance and the azimuthal difference obtained at each of predetermined intervals up to the link candidate point position, an evaluation value that corresponds to a probability that the mobile object is traveling upon a road corresponding to the each link candidate point, for each link including the each link candidate point; and a position calculation unit that calculates the current position based upon the evaluation value, by taking the mobile object as being positioned at a link candidate point, among the plurality of link candidate points, for which the probability is highest.

According to the 12th aspect of the present invention, in the position calculation apparatus according to the 11th aspect, it is preferred that the position calculation apparatus further comprises an error variance calculation unit that calculates the first error variance based upon the distance and calculates the second error variance based upon the azimuthal difference. The probability calculation unit calculates the evaluation value by summing, over the plurality of data items, a sum of a value obtained by dividing a square of the distance included in each of the plurality of data items by a sum of the first error variance and an estimated error variance of the current position, and a value obtained by dividing a square of the azimuthal difference included in the each of the plurality of data items by a sum of the second error variance and an estimated error variance of the azimuth of movement.

According to the 13th aspect of the present invention, in the position calculation apparatus according to the 11th or the 12th aspect, it is preferred that the position calculation apparatus further comprises: a first decision unit that makes, based upon whether or not a value that is obtained by dividing a square of a distance between the current position and the link candidate point position of the link candidate point for which the probability is the highest by a sum of the first error variance and an estimated error variance of the current position, is greater than a first threshold value, a decision as to whether or not there is a difference between the current position and the link candidate point position; a second decision unit that makes, based upon whether or not a value that is obtained by dividing an azimuthal difference between the azimuth of movement and the link candidate point azimuth of the link candidate point for which the probability is the highest by a square root of a sum of the second error variance and an estimated error variance of the azimuth of movement, is greater than a second threshold value, a decision as to whether or not there is a difference between the azimuth of movement and the link candidate point azimuth; and a third decision unit that, when there is a difference between the current position and the link candidate point position or when there is a difference between the azimuth of movement and the link candidate point azimuth, makes a decision that the mobile object has deviated from the road corresponding to the link candidate point for which the probability is the highest and, when there is no difference between the current position and the link candidate point position and there is no difference between the azimuth of movement and the link candidate point azimuth, makes a decision that the mobile object is traveling upon the road corresponding to the link candidate point for which the probability is the highest. When it has been decided by the third decision unit that the mobile object has deviated from the road corresponding to the link candidate point for which the probability is the highest, the position calculation unit calculates that the mobile object is positioned at the current position and, when it has been decided by the third decision unit that the mobile object is traveling along the road corresponding to the link candidate point for which the probability is the highest, the position calculation unit calculates the current position of the mobile object as being positioned at the link candidate point.

According to the 14th aspect of the present invention, in the position calculation apparatus according to any one of the 11th through 13th aspects, it is preferred that the position calculation apparatus further comprises: a reception unit that receives a position measurement signal emitted from a position measurement satellite; and a measurement unit that measures sensor data including at least one of a speed, an angular velocity and an acceleration of the mobile object. The shifting information calculation unit calculates the current position, the shifting speed and the azimuth of movement based upon the position measurement signal and the sensor data; and the estimated error covariance calculation unit calculates the estimated error covariance using the position measurement signal and the sensor data.

According to the 15th aspect of the present invention, in the position calculation apparatus according to any one of the 11th through 14th aspects, it is preferred that the position calculation apparatus further comprises a setting unit that, when a first link and a second link that constitute the plurality of links fork off from a road fork point node and the link candidate point for which the probability is the highest is included in the first link, sets a number of data items in the plurality of data items so as to be reduced, from when the mobile object passes through an intersection that corresponds to the road fork point node until a gap between the link candidate point position of the link candidate point and a road section corresponding to the second link becomes greater than a predetermined value.

Advantageous Effects of Invention

According to the present invention, it is possible to reduce error in road deviation determination during calculation of the position of a mobile object.

BRIEF DESCRIPTION OF DRAWINGS

FIG. 4 is a figure showing the position of the position calculation apparatus in four mesh regions when map information is read in;

FIG. 9 is a figure showing a situation in that mismatching continues after a road fork;

FIG. 10 is a figure showing a situation in that correct matching takes place subsequent to mismatching after a road fork;

FIG. 12 is a figure showing a situation during map matching after a road fork;

FIG. 13 is a figure showing a situation during map matching after a road fork;

DESCRIPTION OF EMBODIMENTS

Figure 1:
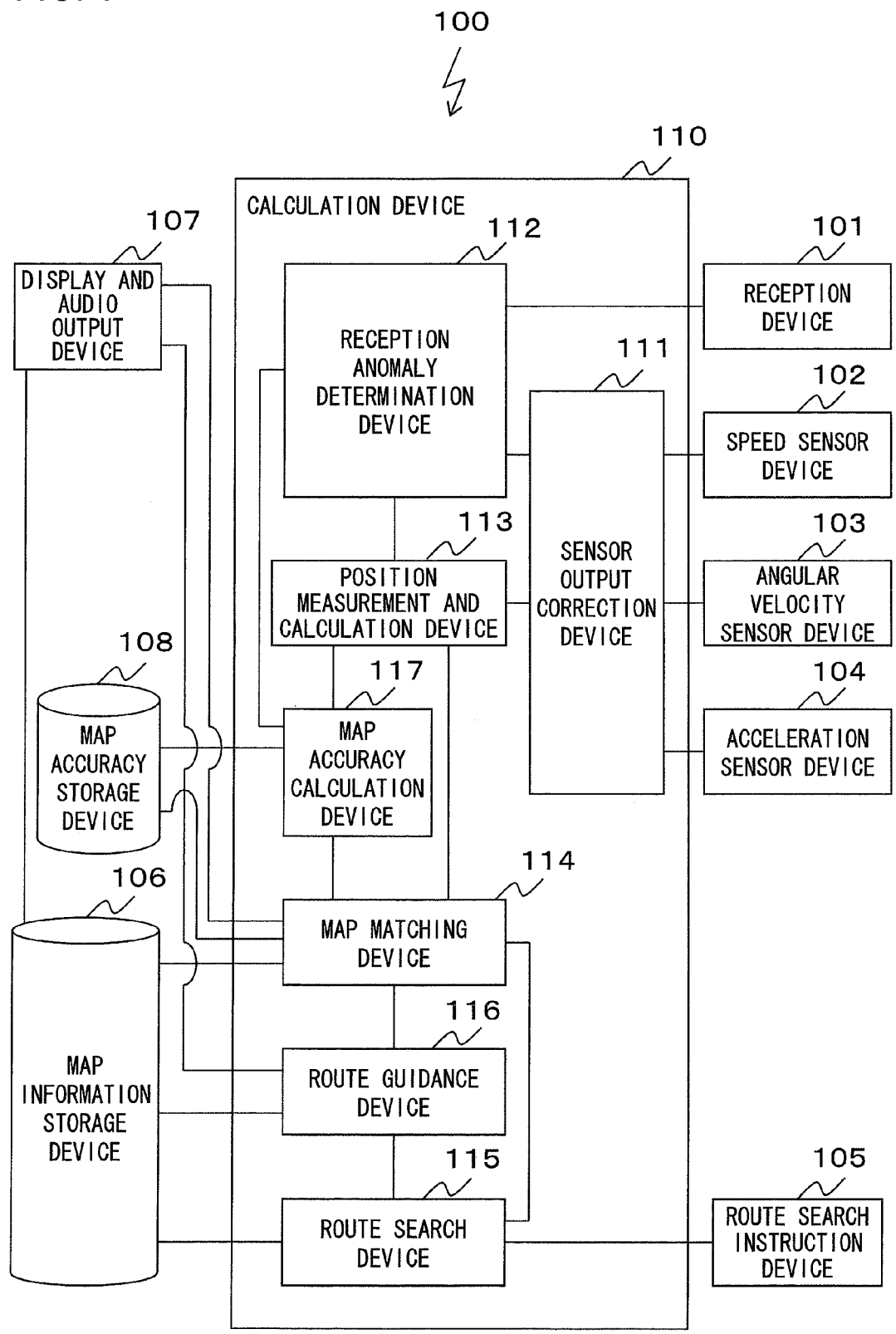
FIG. 1 is a figure showing the structure of a position calculation apparatus according to an embodiment.

The structure of a position calculation apparatus 100 according to an embodiment of the present invention is shown in FIG. 1. This position calculation apparatus 100 includes a reception device 101, a speed sensor device 102, an angular velocity sensor device 103, an acceleration sensor device 104, a route search instruction device 105, a map information storage device 106, a display and audio output device 107, a map accuracy storage device 108, and a calculation device 110.

The reception device 101 includes an antenna, and has processing functions for down conversion, analog to digital conversion, quadrature detection, C/A (coarse acquisition) code generation, correlation detection, and decoding. Position measurement satellites such as GPS satellites, GLONASS satellites, pseudolites and so on are devices that generate signals for position measurement from space or from above the earth. These signals sent from the position measurement satellites (i.e., position measurement signals) are received by the antenna, navigation messages are detected including track information for the position measurement satellites and information about the state of signal generation and ionosphere delay calculation parameters and so on, and observational data are measured such as time instants of reception, pseudo-ranges (distances from the satellites), Doppler frequencies, signal intensities, and so on. The positions of the position measurement satellites are calculated based upon the reception time instants and the track information, and the position of the reception device 101 (i.e. the reception position) is calculated based upon the positions of the position measurement satellites and the pseudo-ranges. Moreover, the velocities of the position measurement satellites are calculated from the positions of the position measurement satellites near the reception time instants obtained based upon the track information, and the speed and the azimuth of the reception device 101 (i.e. its speed vector: the speed upon reception, and the azimuth upon reception) are calculated based upon the positions and velocities of the position measurement satellites and also their Doppler frequencies.

The speed sensor device 102 is a vehicle speed sensor or the like, and is installed upon a wheel axle or the like of the mobile object such as an automobile or the like to which the position calculation apparatus 100 is mounted, and measures the number of pulses that corresponds to the rotational speed of that wheel axle and outputs this pulse number. The angular velocity sensor device 103 is a gyroscope or the like, and outputs a signal corresponding to its angular velocity. And the acceleration sensor device 104 is an accelerometer or the like, and is installed in a direction that is orthogonal to the direction of progression of the mobile object such as an automobile or the like and outputs a signal that corresponds to its acceleration.

The route search instruction device 105 is a remote controller, a touch panel, a microphone or the like, and outputs a destination that has been inputted.

A calculation device 110 that contains a CPU (a central processing unit or central calculation processing device) and memory and so on includes a sensor output correction device 111, a reception anomaly determination device 112, a position measurement and calculation device 113, a map matching device 114, a route search device 115, a route guidance device 116, and a map accuracy calculation device 117.

The sensor output correction device 111 calculates a speed (the sensed speed) by multiplying the output from the speed sensor device 102 by a scale factor for the speed sensor device 102. And the sensor output correction device subtracts a bias for the angular velocity sensor device 103 from the output of the angular velocity sensor device 103, and then calculates the angular velocity (i.e. the sensor angular velocity) by multiplying the result by a scale factor for the angular velocity sensor device 103. Moreover, the sensor output correction device subtracts a bias for the acceleration sensor device 104 from the output of the acceleration sensor device 104, and thus calculates the acceleration (i.e. the sensor acceleration).

The reception anomaly determination device 112 determines upon anomaly of the reception position, the reception speed, and the reception azimuth by using the reception position, the reception speed, and the reception azimuth from the reception device 101, and the sensor speed, the sensor angular velocity, and the sensor acceleration from the sensor output correction device 111.

The position measurement and calculation device 113 calculates the position, the azimuth, and the speed of the position calculation apparatus 100, and the covariance of the errors in its position and its azimuth, by using the reception position, the reception speed, the reception azimuth, and the reception anomaly determination results for these from the reception anomaly determination device 112, and the sensor speed, the sensor angular velocity, and the sensor acceleration from the sensor output correction device 111.

The map matching device 114 reads in link information stored in the map information storage device 106. And, based upon the position and azimuth of the position calculation apparatus 100 from the position measurement and calculation device 113 and their covariance, it calculates evaluation values for the points (called "link candidate points") at the feet of perpendiculars dropped onto the links from the position of the position calculation apparatus 100, and takes the link candidate point having the highest evaluation value probability that the vehicle is traveling upon the road as being a first link candidate point. And the position calculation apparatus 100 makes a decision as to whether or not the vehicle is deviating from the road, based upon the positions of the nodes, the link azimuths, their variances, the road width information, the position and azimuth of the position calculation apparatus 100, and the covariance thereof.

Based upon the link number of the first link candidate point from the map matching device 114 and the number of the link that is closest to the destination, the route search device 115 searches a plurality of routes that connect those links, and selects the route whose distance is the shortest.

The route guidance device 116 acquires the link number and the position of the first link candidate point from the map matching device 114, acquires the link numbers for the guidance route from the route search device 115, and acquires information about display for guidance and so on from the map information storage device 106. If the distance between a road that forks off to the right or the left and the position of the first link candidate point is less than or equal to a predetermined value, then a guidance start signal is turned to ON, and guidance information such as a direction for guidance signal that shows a direction for guidance, a display for guidance, the guidance start signal and so on is sent to the display and audio output device 107. Moreover, if the link number of the first link candidate point is different from the link numbers on the guidance route, then the route search start signal is turned to ON, and this route search start signal is sent to the route search device 115.

If it is determined that there is no deviation from the road, and moreover that the variance of the error of the estimated position is less than or equal to some threshold value, then the map accuracy calculation device 117 calculates the vector from the first link candidate point to the estimated position, determines the sign of this vector according to its component in the northward direction, and calculates the error of the link position at the current position using the magnitude and the sign of this vector. Moreover, if it is determined that there is no deviation from the road, and also that the variance of the error of the estimated azimuth is less than or equal to some threshold value, then the map accuracy calculation device takes the difference between the estimated azimuth and the azimuth of the first link candidate point as being the error of the link azimuth at the current position. Then the map accuracy calculation device adds the errors of the link position and of the azimuth at the current position, and their squares, respectively to the summed values and to the summed value of squares of the errors in the link positions and in their azimuths in a predetermined region that includes the current position, and adds 1 to the count number of errors in the link positions and azimuths in this predetermined region that includes the current position. Finally, using the summed values and the summed value of squares of the errors in the link positions and in the azimuths, and the count number, the map accuracy calculation device calculates the error variances of the link positions and azimuths in this predetermined region that includes the current position.

The map information storage device 106 is a hard disk or a memory or the like, and stores, for each of predetermined mesh regions, information such as node numbers, node coordinates, link numbers, link information such as road width and attributes and so on, and guidance displays and so on. Nodes are points upon roads, and links are straight lines that join nodes together.

The display and audio output device 107 includes a monitor and a speaker and so on, and acquires map matching results such as the position and the azimuth of the position calculation apparatus 100, link numbers, the position and the azimuth of the first link candidate point, the road deviation decision result, and so on from the map matching device 114, acquires a guidance start signal and guidance information from the route guidance device 116, reads in link information for positions around the position calculation apparatus from the map information storage device 106, and draws the position and the azimuth of the links and the first link candidate point. Furthermore, when a guidance start signal goes to ON, this display and audio output device 107 outputs a display for guidance, and outputs a direction for guidance by audio.

The map accuracy storage device 108 is a hard disk or a memory or the like, and, for each of the predetermined regions, stores a variance, a count number, a summed value, and a summed value of sums of squares related to the errors in the link positions and the errors in their azimuths.

Figure 2:
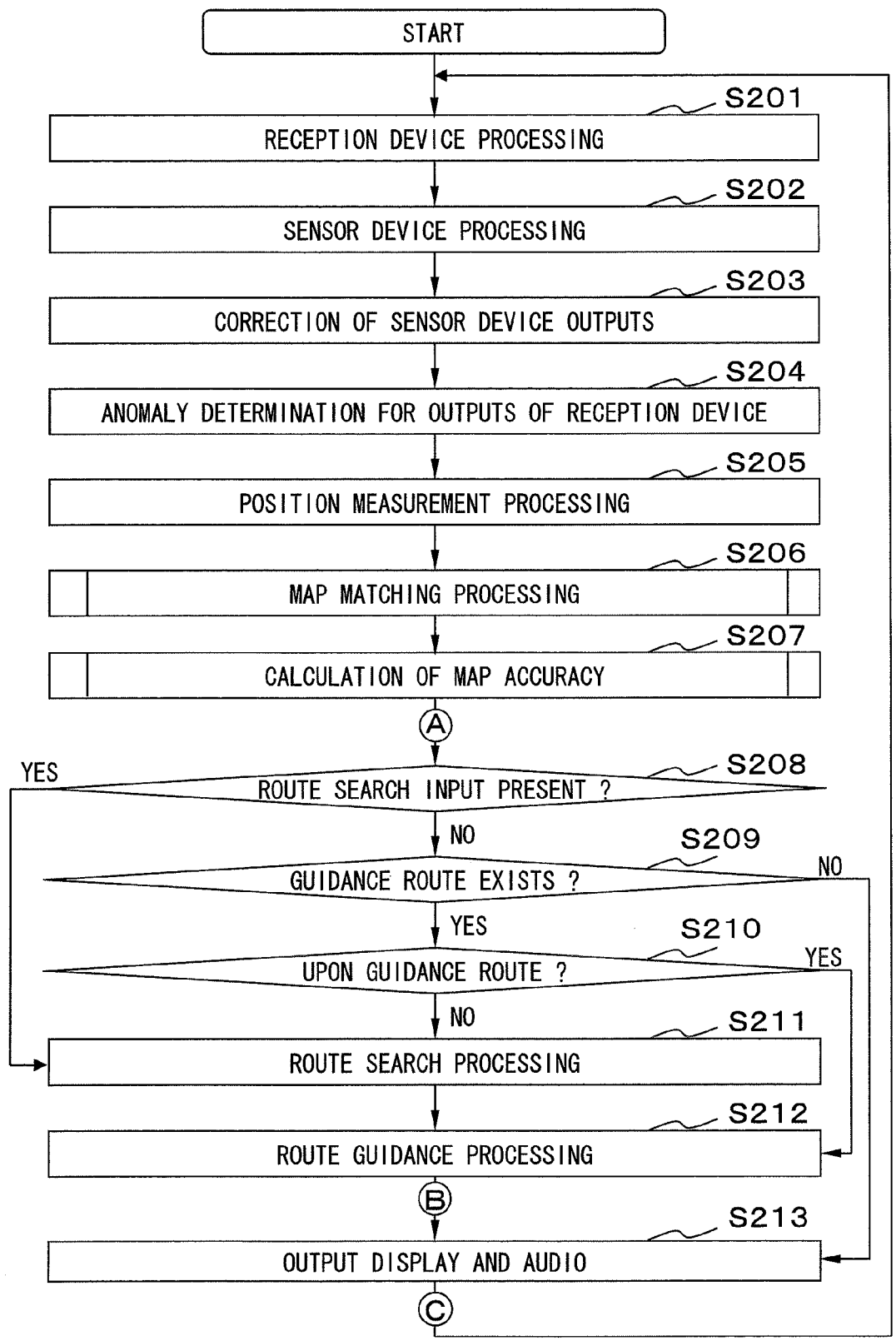
FIG. 2 is a figure showing the operation of the position calculation apparatus.

The operational procedure performed by the position calculation apparatus 10 shown in FIG. 1 will now be explained with reference to FIG. 2.

First in the step S201 the reception device 101 receives the signals sent from the position measurement satellites (i.e. the position measurement signals), detects navigation messages including track information for the position measurement satellites, information about transmission state and ionosphere delay calculation parameters and so on, and measures observation data such as the time instants of reception, pseudo-ranges, Doppler frequencies, signal intensities, and so on. And the reception device 101 calculates the positions of the position measurement satellites based upon the reception time instants and the track information, and calculates the position of reception based upon the positions of the position measurement satellites and the pseudo-ranges. Moreover, it calculates the velocities of the position measurement satellites from the positions of the position measurement satellites in the vicinity of the time instants of reception based upon the track information, calculates the reception speed and the reception azimuth based upon the positions and velocities of the position measurement satellites and also their Doppler frequencies, and sends the reception position, the reception speed, and the reception azimuth to the reception anomaly determination device 112. And the reception anomaly determination device 112 receives this information.

Then in the step S202 the speed sensor device 102 measures the number of pulses accompanying the rotation of the wheel axle of the mobile object, and outputs this to the sensor output correction device 111. And the sensor output correction device 111 receives the output of the speed sensor device 102. The angular velocity sensor device 103 sends a signal corresponding to the angular velocity of the mobile object to the sensor output correction device 111. And the sensor output correction device 111 receives the output of the angular velocity sensor device 103. Moreover, the acceleration sensor device 104 sends a signal corresponding to the acceleration of the mobile object to the sensor output correction device 111. And the sensor output correction device 111 receives the output of the acceleration sensor device 104.

Then in the step S203 the sensor output correction device 111 multiplies the output from the speed sensor device 102 by the scale factor for the speed sensor device 102, and thus calculates the sensor speed. And it subtracts the bias of the angular velocity sensor device 103 from the output of the angular velocity sensor device 103, and then multiplies the result by the scale factor for the angular velocity sensor device 103, thus calculating the angular velocity. Moreover, the sensor output correction device subtracts a bias for the acceleration sensor device 104 from the output of the acceleration sensor device 104, and thus calculates the acceleration. The values that have been calculated are sent to the reception anomaly determination device 112 and to the position measurement and calculation device 113.

Then in the step S204 the reception anomaly determination device 112 receives the reception position, the reception speed, and the reception azimuth from the reception device 101, and receives the sensor speed, the sensor angular velocity, and the sensor acceleration from the sensor output correction device 111. And the reception anomaly determination device calculates the position change over a predetermined time period from the sensor speed and the sensor angular velocity, and decides that the reception position is anomalous if the difference between this position change and the change of the reception position over the predetermined time period is greater than or equal to a threshold value, while deciding that the reception position is normal if this is not the case. And the reception anomaly determination device calculates the difference between the reception speed and the sensor speed, and decides that the reception speed is anomalous if this difference is greater than or equal to a threshold value, while deciding that the reception speed is normal if this is not the case. Moreover, the reception anomaly determination device calculates the azimuth change over a predetermined time period from the sensor angular velocity, and decides that the reception azimuth is anomalous if the difference between this azimuth change and the change of the reception azimuth over the predetermined time period is greater than or equal to a threshold value, while deciding that the reception azimuth is normal if this is not the case. And it sends the reception anomaly determination result, the reception position, the reception speed, and the reception azimuth to the position measurement and calculation device 113.

Then in the step S205 the position measurement and calculation device 113 receives the reception anomaly determination result, the reception position, the reception speed, and the reception azimuth from the reception anomaly determination device, and also receives the sensor speed, the sensor angular velocity, and the sensor acceleration from the sensor output correction device 111, and performs position measurement processing. In the operational procedure for this position measurement processing, when the position of the position calculation apparatus, the speed and acceleration of the progression direction, the azimuth, the angular velocity of the azimuth, and the pitch angle are taken as state quantities, and when the sensor speed, the sensor angular velocity, the sensor acceleration, the reception position, the reception speed, and the reception azimuth are taken as observation quantities, the state equation (continuous type) shown as Equation (1) and the observation equation (continuous type) shown as Equation (2) may be set up. In Equation (1), the acceleration and the angular velocity are taken as primary Markov processes. Here, x(t) and y(t) are the position of the position calculation apparatus 100 in the longitude direction and its position in the latitude direction (i.e. its current position), v(t) and a(t) are its speed in the direction of progression (i.e. its shifting speed) and its acceleration, θ(t) and ω(t) are its azimuth (i.e. the azimuth of movement) and the angular velocity of its azimuth, φ(t) is the pitch angle, θp is the predictive value of the azimuth (i.e. the predictive value of the azimuth of movement), φp is the predictive value of the pitch angle, αa and αω are respectively the reciprocal of the time constant of the acceleration and the reciprocal of the time constant of the angular velocity, σa is the standard deviation of the acceleration, σω and σφ are respectively the standard deviation of the angular velocity of the azimuth (i.e. of the azimuth of movement) and the standard deviation of the pitch angle, w(t) is white color noise having average 0 and standard deviation 1, η(t) is the state quantity vector, vs(t) is the sensor speed, gs(t) is the sensor acceleration, ωs(t) is the sensor angular velocity, (xr(t), yr(t), zr(t)) is the reception position, vr(t) is the reception speed, θr(t) is the reception azimuth, ε(t) is the observation noise vector, y(t) is the observation quantity vector y(t), and F, G, and H are matrixes. The predictive value θp of the azimuth (i.e. the azimuth of movement) and the predictive value φp of the pitch angle are obtained from a predicted state estimate vector calculated according to Equation (5).

[Equation 1]

$$\dot{\eta}(t) = F\eta(t) + Gw(t) \qquad (1)$$

$$\begin{bmatrix} \dot{x}(t) \\ \dot{y}(t) \\ \dot{z}(t) \\ \dot{v}(t) \\ \dot{a}(t) \\ \dot{\theta}(t) \\ \dot{\omega}(t) \\ \dot{\phi}(t) \end{bmatrix} = \begin{bmatrix} 0 & 0 & 0 & \cos\theta p & 0 & 0 & 0 & 0 \\ 0 & 0 & 0 & \sin\theta p & 0 & 0 & 0 & 0 \\ 0 & 0 & 0 & \sin\phi p & 0 & 0 & 0 & 0 \\ 0 & 0 & 0 & 0 & 1 & 0 & 0 & 0 \\ 0 & 0 & 0 & 0 & -\alpha a & 0 & 0 & 0 \\ 0 & 0 & 0 & 0 & 0 & 0 & 1 & 0 \\ 0 & 0 & 0 & 0 & 0 & 0 & -\alpha\omega & 0 \\ 0 & 0 & 0 & 0 & 0 & 0 & 0 & 0 \end{bmatrix}$$

$$\begin{bmatrix} x(t) \\ y(t) \\ z(t) \\ v(t) \\ a(t) \\ \theta(t) \\ \omega(t) \\ \phi(t) \end{bmatrix} + \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & \sigma a & 0 & 0 & 0 \\ 0 & 0 & 0 & 0 & 0 & 0 & 0 & 0 \\ 0 & 0 & 0 & 0 & 0 & 0 & \sigma\omega & 0 \\ 0 & 0 & 0 & 0 & 0 & 0 & 0 & \sigma\phi \end{bmatrix} w(t)$$

[Equation 2]

$$y(t) = H\eta(t) + \varepsilon(t) \qquad (2)$$

$$\begin{bmatrix} vs(t) \\ gs(t) \\ \omega s(t) \\ xr(t) \\ yr(t) \\ zr(t) \\ vr(t) \\ \theta r(t) \end{bmatrix} = \begin{bmatrix} 0 & 0 & 0 & 1 & 0 & 0 & 0 & 0 \\ 0 & 0 & 0 & 0 & 0 & 0 & 0 & -g\sin\phi p \\ 0 & 0 & 0 & 0 & 0 & 0 & 1 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \end{bmatrix} \begin{bmatrix} x(t) \\ y(t) \\ z(t) \\ v(t) \\ a(t) \\ \theta(t) \\ \omega(t) \\ \phi(t) \end{bmatrix} + \varepsilon(t)$$

If the reception position, the reception speed, and the reception azimuth are normal, then the position measurement and calculation device 113 calculates the estimated speed, the estimated acceleration, the estimated azimuth, the estimated angular velocity, and the estimated pitch angle of the position calculation apparatus 100 by using Equations (3) through (7). A Kalman filter can be calculated with Equations (3) through (7). Here, K(k) is the gain matrix, R is the observation noise matrix, η(k|k) is the posteriori state estimate vector, η(k|k+1) is the predicted state estimate vector, P(k|k) and P(k|k+1) are the estimated error covariance matrix of the posteriori state estimate vector η(k|k) and the estimated error covariance matrix of the predicted state estimate vector η(k|k+1), Φ(Δt, αa, αω) is the state transition matrix, Δt is the sampling interval, and Q(k) is the process noise (system noise) matrix.

[Equation 3]

$$K(k) = P(k|k-1)H^T(k)[H(k)P(k|k-1)H^T(k)+R]^{-1} \qquad (3)$$

[Equation 4]

$$\eta(k|k) = \eta(k|k-1) + K(k)[y(k) - H\eta(k|k-1)] \qquad (4)$$

[Equation 5]

$$\eta(k+1|k) = \Phi(\Delta t, \alpha a, \alpha\omega)\eta(k|k) \qquad (5)$$

[Equation 6]

$$P(k|k) = P(k|k-1) - K(k)H(k)P(k|k-1) \qquad (6)$$

[Equation 7]

$$P(k|k-1) = \Phi(\Delta t, \alpha) P(k|k-1) \Phi^T(\Delta t, \alpha a, \alpha \omega) + Q(k) \qquad (7)$$

Here, if it has been decided that the reception position is anomalous, then the terms that correspond to the reception position are eliminated from the observation quantity vector y, from the matrix H, and from the observation noise matrix R. And, if it has been decided that the reception speed is anomalous, then the terms that correspond to the reception speed are eliminated from the observation quantity vector y, from the matrix H, and from the observation noise matrix R. Moreover, if it has been decided that the reception azimuth is anomalous, then the terms that correspond to the reception azimuth are eliminated from the observation quantity vector y, from the matrix H, and from the observation noise matrix R. Yet further, if there is no output of the reception position, the reception speed, and the reception azimuth from the reception device 101, then the terms that correspond to the reception azimuth, the reception speed, and the reception azimuth are eliminated from the observation quantity vector y, from the matrix H, and from the observation noise matrix R.

The position measurement and calculation device 113 sends the position of the position calculation apparatus 100 (i.e. the current position), its azimuth (i.e. the azimuth of movement), the speed (i.e. the speed of movement), and the estimated error covariance of the position and the azimuth to the map matching device 114 and to the map accuracy calculation device 117.

Next in the step S206 the map matching device 114 reads in information such as node numbers, node positions, link numbers, widths of link roads and so on from the map information storage device 106, and also reads in from the map accuracy storage device 108 the variance of the position errors of links in a region that includes the position of the position calculation apparatus 100 and the variance of their azimuth errors. Then the map matching device moves forward a predetermined number of link candidate points, and constructs link candidate points upon the links that are that predetermined distance in front of the vehicle. And, for all of these link candidate points, the map matching device calculates the covariance of the position errors of the link candidate points based upon the link azimuths of the link candidate points and the variance of the position errors of the links in a predetermined region that includes the position of the position calculation apparatus 100. The variance of the link candidate points is taken as being the variance of the azimuth errors of the links in the predetermined region that includes the position of the position calculation apparatus 100. Then evaluation values for the link candidate points are calculated based upon the covariances of the position errors of the link candidate points and the variance of the azimuth errors of the links in a predetermined region that includes the position of the position calculation apparatus 100, the covariance of the position of the position calculation apparatus 100 and the covariance of its azimuth, and the position and azimuth of the position calculation apparatus 100 and the link candidate points. And, among these link candidate points, the link candidate point having the highest evaluation value probability that the vehicle is traveling upon that road is determined as being the first link candidate point. Next, the position calculation apparatus 100 makes a decision as to whether the vehicle is deviating from the road, based upon the positions and azimuths of the link candidate points, the covariance of the position error, the variance of the azimuth error, the road width information, the position and azimuth of the position calculation apparatus 100, and the covariances of each of the position and the azimuth of the position calculation apparatus 100. And the map matching device 114 not only sends the position, the azimuth, and the link number of the first link candidate point and also the road deviation decision result to the route search device 115 and to the route guidance device 116, but also sends the position and the azimuth of the position calculation apparatus 100 and also the link number, the position, and the azimuth of the first link candidate point and the road deviation decision result to the display and audio output device 107. The details of the processing in this step S206 will be explained hereinafter with reference to FIGS. 3 and 7.

In the step S207 the map accuracy calculation device 117, along with receiving the estimated position and the estimated azimuth and the variances of their errors from the position measurement and calculation device 113, and along with receiving the road deviation decision result and the position and the azimuth of the first link candidate point from the map matching device 114, also reads in the count numbers, the summed values, and the summed value of squares, related to each of the errors in the link positions and the errors in the azimuths in a predetermined region that includes the estimated position. If it is decided that the vehicle is not deviating from the road, and moreover that the variance of the error in the estimated position is less than or equal to its threshold value, then the map accuracy calculation device calculates the vector from the first link candidate point to the estimated position, determines the sign of this vector according to its component in the northward direction, and calculates the error of the link position at the current position using the magnitude and the sign of the vector. Here, if the direction of the vector is from the eastward direction to the westward direction in the anticlockwise direction (including directly east), then it is taken as being positive, whereas if it is from the westward direction to the eastward direction in the anticlockwise direction (including directly west), then it is taken as being negative. The error in the link position and its square are added to the summed value and to the summed value of sums of squares of the link position errors in the predetermined region that includes the current position, and 1 is added to the count number of link position errors in the predetermined region that includes the current position. And the variance in the link position errors in the predetermined region that includes the current position is calculated, using the summed value and the summed value of sums of squares of the link position errors, and the count number. Moreover, if it is determined that there is no deviation from the road, and also that the variance of the error of the estimated azimuth is less than or equal to its threshold value, then the map accuracy calculation device takes the difference between the estimated azimuth and the azimuth of the first link candidate point as being the error of the link azimuth at the current position. And the error of the link azimuth at the current position and its square are respectively added to the summed value and to the summed value of sums of squares of the errors in link azimuth in the predetermined region that includes the current position, and 1 is added to the count number of errors of link azimuth in the predetermined region that includes the current position. Then, using the summed values and the summed values of sums of squares of the errors in the link positions and azimuths, and the count number, the map accuracy calculation device 117 calculates the error variances of the link azimuths in this predetermined region that includes the current position. And the map accuracy calculation device 117 stores, in the map accuracy storage device 108, the variances, the count number, the summed values, and the summed values of sums of squares related to the errors in the link positions and to the errors in their azimuths in a predetermined region that includes the estimated position.

In the step S208, if input of a destination has been performed via the route search instruction device 105, then the route search instruction device 105 sends this destination that has been inputted to the route search device 115, and the flow of control is transferred to the step S211. But if no destination has been inputted, then the flow of control proceeds to the step S209.

In the step S209, if a guidance route has been established, then the flow of control proceeds to the step S210. However, if this is not the case, then the flow of control is transferred to the step S213.

In the step S210, if the link upon which the first link candidate point is located is included in the links upon the guidance route, then the flow of control is transferred to the step S212. However, if this is not the case, then the flow of control proceeds to the step S211.

In the step S211, the route search device 115 reads in link information for the vicinity of the destination from the map information storage device 106, calculates the distances from the destination to the links, and takes the closest link number as being links of the destination. And the route search device 115 receives the link number, the position, and the azimuth of the first link candidate point from the map matching device 114, searches a plurality of routes connecting from the link of the first link candidate point to the link of the destination that face in its azimuths, and takes the route having the shortest distance as being the guidance route. And the route search device 115 sends the link numbers upon the guidance route to the route guidance device 116.

In the step S212, the route guidance device 116 receives the numbers of the links upon the guidance route from the route search device 115, receives the position, azimuth, and link number of the first link candidate point and also the road deviation decision result from the map matching device 114, and reads in information such as a display for guidance and so on from the map information storage device 106. When the road deviation decision result is that the vehicle is traveling along the road, in other words when it is decided that the vehicle is not deviating from the road, and moreover the distance between a forking road where the mobile object should turn right or left and the position of the first link candidate point is less than or equal to a predetermined value, then the guidance start signal is turned to ON, and guidance information such as a direction for guidance signal that specifies a direction for guidance, a display for guidance, a guidance start signal and so on is sent to the display and audio output device 107.

In the step S213, the display and audio output device 107 acquires the position and the azimuth of the position calculation apparatus 100, the link number, the position, and the azimuth of the first link candidate point and also the road deviation decision result from the map matching device 114, acquires the guidance start signal and the guidance information from the route guidance device 116, and reads in link information for positions around the position calculation apparatus 100 from the map information storage device 106. If the road deviation decision result is that the vehicle is traveling along the road, in other words if it is decided that the vehicle is not deviating from the road, then the display and audio output device 107 draws a car mark that specifies the position and the azimuth of the first link candidate point, and also draws the links around the position of the first link candidate point. But if the road deviation decision result is that the vehicle is deviating from the road, then the display and audio output device 107 draws a car mark that specifies the position and the azimuth of the position calculation apparatus 100, and also draws the links around the position of the position calculation apparatus 100. Moreover, if the guidance start signal is ON, it outputs a display for guidance, and outputs a direction for guidance via audio.

Figure 3:
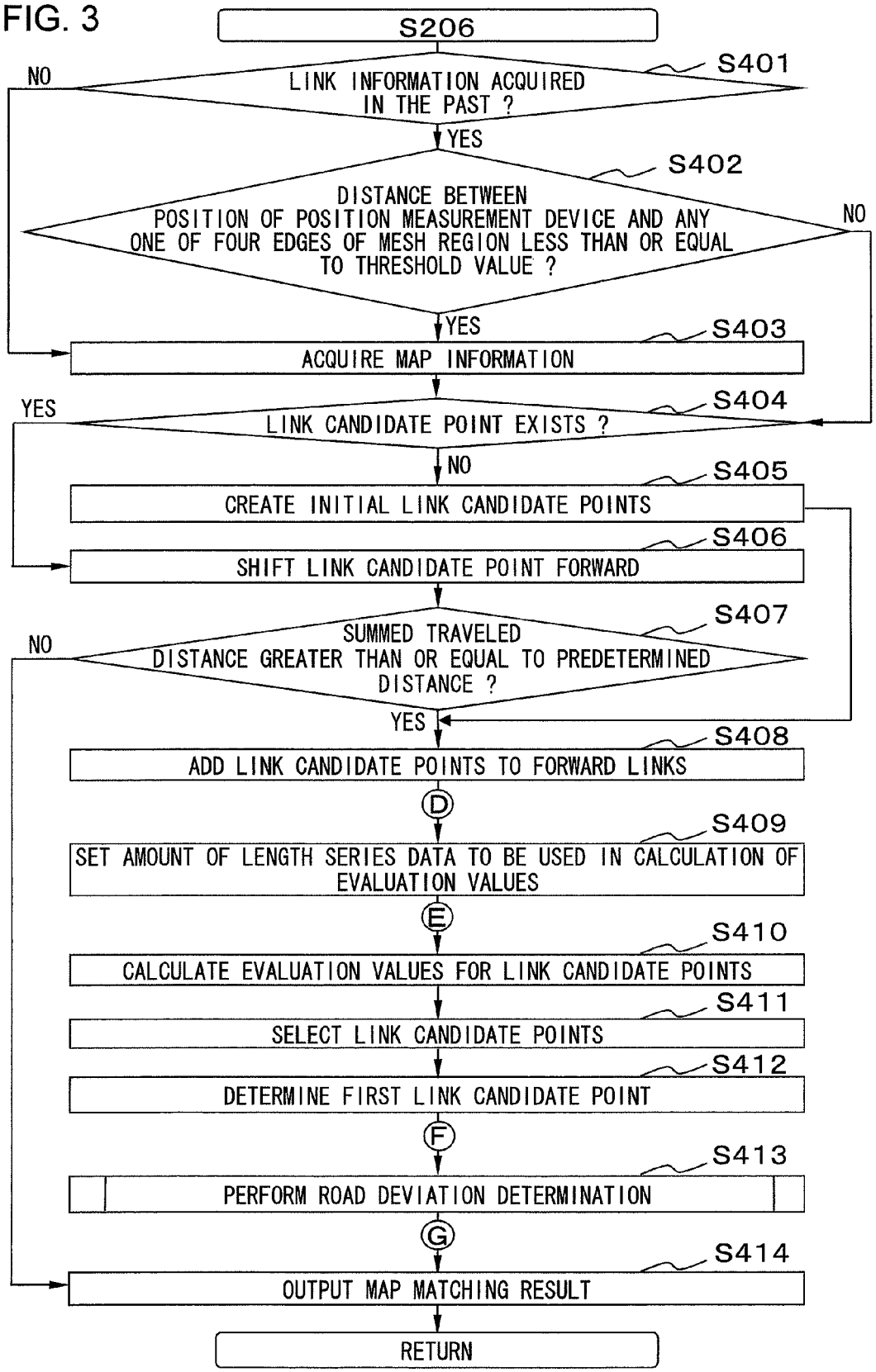
FIG. 3 is a figure showing operation of the position calculation apparatus for map matching processing.

The step S206 (in FIG. 2) of the operational procedure of the position calculation apparatus 100 will now be explained with reference to FIG. 3.

In the first step S401, if the map matching device 114 has read in the link information in the past from the map information storage device 106, then the flow of control proceeds to the step S402. But if this is not the case, then the flow of control is transferred to the step S403.

In the step S402, if any one of the distances from the position 601 of the position calculation apparatus 100 to the four edges of the mesh region 602 is shorter than a predetermined distance, in other words if the position 601 of the position calculation apparatus 100 is within the region 603 (the hatched portion) that follows along the four edges of the mesh region 602 shown in FIG. 4(a), then the flow of control proceeds to the step S403. However, if this is not the case, then the flow of control is transferred to the step S404.

In the step S403, the map matching device 114 reads in the link information from the mesh region that includes the position 601 of the position calculation apparatus 100, and also the link information from the three mesh regions that are closest to the position of the position calculation apparatus. As shown in FIG. 4(b), for the four mesh regions 612 containing those three mesh regions and the mesh region that includes the position 601 of the position calculation apparatus 100, the position 601 of the position calculation apparatus 100 cannot be included in all of the regions 613 (the hatched portions) in the vicinity of the edges of all of the four mesh regions 612. Then the flow of control proceeds to the step S404.

In the step S404, if there is at least one link candidate point, then the flow of control is transferred to the step S406. However, if there are no link candidate points, then the flow of control is transferred to the step S405.

In the step S405, the map matching device 114 calculates the distance between each one of all of the links in the mesh region that includes the position of the position calculation apparatus 100 and the position of the position calculation apparatus 100, selects a predetermined number of links in order of shortness of these distances, and creates link candidate points for those links. The link azimuths of the link candidate points are set so that the differences between the link azimuths of the link candidate points and the azimuth of the position calculation apparatus become less than or equal to 90°.

In the step S406, the map matching device 114 receives, from the position measurement and calculation device 113, the position, the azimuth and the speed of the position calculation apparatus, and also the error covariance of the position and the azimuth of the position calculation apparatus. And the map matching device shifts the position of each link candidate point by an amount equal to the distance traveled, this being previously obtained by multiplying the period of the processing cycle by the speed of the position calculation apparatus 100 along the link.

In the step S407, the map matching device 114 multiplies the period of the processing cycle by the speed of the position calculation apparatus 100, and adds the result to the distance traveled in the previous processing cycles. If the traveled distance is greater than or equal to a predetermined distance, then the traveled distance is set to zero in order to perform map matching, and then the flow of control proceeds to the step S408. But if this is not the case, then the flow of control is transferred to the step S414.

In the step S408, the map matching device 114 newly adds link candidate points to all the links, a predetermined distance forward from their link candidate points.

In the step S409, if the first link candidate point in the previous cycle (after having been shifted forwards) is between a road fork at less than or equal to a predetermined angle and a ground point where the distance between links is less than or equal to a predetermined distance, then the map matching device 114 sets the number of length series data for the position and the azimuth of the position calculation apparatus 100 at the predetermined interval that is used in the calculation of the evaluation values, to a second predetermined number that is smaller than the normal first predetermined number. Data based upon the position and the azimuth of the position calculation apparatus 100 at predetermined intervals will be termed "length series data".

Figure 5:
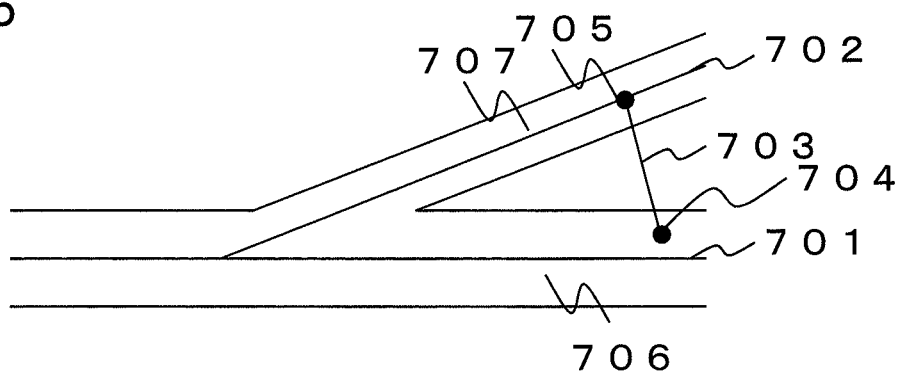
FIG. 5 is a figure showing a distance between links.

If the first link candidate point in the previous cycle is after the road fork that is at less than or equal to a predetermined angle, and is also after the ground point at which the distance between links becomes greater than a predetermined distance, then an amount of length series data after the time when the distance between links becomes greater than a predetermined distance is set. However, if the amount of length series data is larger than a normal first predetermined number, then it is set to the normal first predetermined number. Moreover, if the first link candidate point in the previous cycle passes through a road fork point at an angle greater than the predetermined angle, then the normal first predetermined number is set for the amount of length series data. FIG. 5 shows a situation in which a single lane road 707 that includes a section corresponding to a link 702 forks off from a two lane road 706 that includes a section corresponding to a link 701. As shown in FIG. 5, in consideration of the road width of the road denoted by the link 701 and the road width of the road denoted by the link 702, the distance 703 between the link 701 and the link 702 is the distance between the centers 704 and 705 of the lanes of the roads that are closest to one another. It should be understood that, since either one of the centers 704 and 705 is positioned in the neighborhood of the first link candidate point, accordingly it would also be acceptable to replace the distance 703 by the distance between that one, among the links 701 and 702, that does not include the first link candidate point, and the first candidate point.

Figure 6:
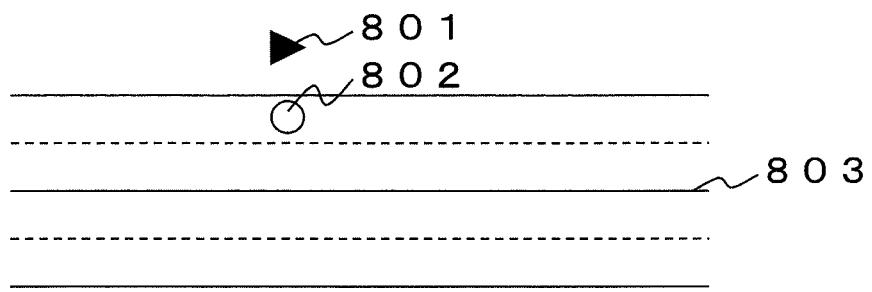
FIG. 6 is a figure showing positions of the position calculation apparatus and of a link candidate point.

In the step S410, the map matching device 114 reads in from the map accuracy storage device 108 the variance of the link positions and azimuths in a predetermined region that includes the position of the position calculation apparatus 100. Then an evaluation value T for each link candidate point is calculated using Equations (8) through (11). Here, (xe, ye) is the position of the position calculation apparatus 100, θe is the azimuth of the position calculation apparatus 100, (xl, yl) is the position of the link candidate point at the foot of the perpendicular from the position calculation apparatus 100 to the link, θl is the azimuth of the link candidate point, Σe is the error covariance matrix of the position and the azimuth of the position calculation apparatus 100, Σl is the error covariance matrix of the position and the azimuth of the link candidate point, σyl and σθl are the standard deviation of the position error and the standard deviation of the azimuth error of the links in a surrounding region that includes the position of the position calculation apparatus 100, m is the length series data item number, and n is the amount of length series data. However, in consideration of the road width of the link 803 and the direction of traveling of the mobile object to which the position calculation apparatus 100 is mounted, as shown in FIG. 6, the position (xl, yl) of the link candidate point 802 is arranged in the center of the closest lane to the position 801 that corresponds to the position of the position calculation apparatus 100. As described above, the historical positions (xe, ye) of the position calculation apparatus 100 included in each of the plurality of items of length series data are positioned at equidistant intervals a predetermined distance apart in the step S407. In Equation (8), the evaluation value T is obtained by summing n items of the length series data from the length series data item number i=m−n+1 to the length series data item number i=m, in other words by summing n items of the length series data back from the position (xl, yl) of the link candidate point (i.e., n items in the direction opposite to the direction of movement). In the length series data item having the length series data item number i, there are included: the vector ($\Delta x$, $\Delta y$) that gives the distance from the position (xe, ye) of the position calculation apparatus 100 to the position (xl, yl) of the link candidate point, the azimuthal difference $\Delta \theta$ between the azimuth θe of the position calculation apparatus 100 and the azimuth θl of the link candidate point, the error variances of the position and of the azimuth of the position calculation apparatus and of the link candidate point, the values of the terms in the summation $\Sigma$ of Equation (8), and so on. The values of the terms in the summation $\Sigma$ correspond to one item of the length series data, and are the sum of a value that is obtained by making the distance between the position (xe, ye) of the position calculation apparatus 100 and the position (xl, yl) of the link candidate point dimensionless, and a value that is obtained by making the azimuthal difference $\Delta \theta$ between the azimuth of movement θe of the position calculation apparatus 100 and the azimuth θl of the link candidate point dimensionless. This value that is obtained by making the distance between the position (xe, ye) of the position calculation apparatus 100 and the position (xl, yl) of the link candidate point dimensionless is obtained by dividing the square of the length (the distance) of the vector ($\Delta x$, $\Delta y$) that represents this distance, by the sum of the square of the standard deviation σpl (i.e. the error variance) of the position errors of the links in the surrounding region including the position (xe, ye) of the position calculation apparatus 100 and the estimated error variance of the position (xe, ye) of the position calculation apparatus 100. And the value that is obtained by making the distance between the azimuth of movement θe of the position calculation apparatus 100 and the azimuth of movement θl of the link candidate point dimensionless is obtained by dividing the square of their azimuthal difference $\Delta \theta$ by the sum of the square of the standard deviation σθl (i.e. the error variance) of the azimuth errors of the links in the surrounding region described above and the estimated error variance of the azimuth θe of the position calculation apparatus 100. If it is hypothesized that the error covariances of the position and the azimuth of the position calculation apparatus 100 and the link candidate point 802 follow normal distributions, then the evaluation values T follow a chi-squared distribution having 2×n degrees of freedom. This 2×n degrees of freedom is based upon the two parameters of position (i.e. distance) and azimuth, and upon the number n of length series data items. Due to this, when the evaluation value T is substituted for the probability density function of this chi-squared distribution of 2×n degrees of freedom, it is possible to convert the probability that these values of differences calculated from the position and the azimuth of the position calculation apparatus and the positions and azimuths of the link candidate points have occurred while the position calculation apparatus is traveling along the road (i.e. along the link), in other words into the probability of their existence in consideration of the differences in position and in azimuth. To put it in another manner, it can be converted into a probability that the position calculation apparatus is traveling along the road (i.e. along the link).

[Equation 8]
$$T = \sum_{i=m-n+1}^{m} [\Delta x(i) \quad \Delta y(i) \quad \Delta \theta(i)] \sum_{d}^{-1}(i) \begin{bmatrix} \Delta x(i) \\ \Delta y(i) \\ \Delta \theta(i) \end{bmatrix} \quad (8)$$

[Equation 9]
$$\begin{bmatrix} \Delta x(i) \\ \Delta y(i) \\ \Delta \theta(i) \end{bmatrix} = \begin{bmatrix} x_e(i) \\ y_e(i) \\ \theta_e(i) \end{bmatrix} - \begin{bmatrix} x_l(i) \\ y_l(i) \\ \theta_l(i) \end{bmatrix} \quad (9)$$

[Equation 10]
$$\sum_{d}(i) = \sum_{e}(i) + \sum_{l}(i) \quad (10)$$

[Equation 11]
$$\sum_{l}(i) = \begin{bmatrix} \sigma_{pl}^2 \sin^2 \theta_l(i) & 0 & 0 \\ 0 & \sigma_{pl}^2 \cos^2 \theta_l(i) & 0 \\ 0 & 0 & \sigma_{\theta l}^2 \end{bmatrix} \quad (11)$$

In the step S411, from among the link candidate points, the map matching device 114 selects a predetermined number of link candidate points in order of smallness of their evaluation values T (i.e. selects link candidate points for which the probability that the vehicle is traveling upon that road is high), and eliminates information about the link candidate points other than these. This is in order to reduce the amount of calculation during map matching.

In the step S412 the map matching device 114 takes, from among the link candidate points, that link candidate point for which the evaluation value T is the smallest (i.e. for which the probability that the vehicle is traveling upon its road is highest), as being the first link candidate point.

In the step S413, the map matching device 114 makes a decision as whether or not deviation from the road has occurred, based upon the position and the azimuth of the position calculation apparatus 100, the positions and the azimuths of the link candidate points, the covariance of these, and also the number of visible satellites that are being received by the reception device 101. The details of the processing in this step S413 will be explained hereinafter with reference to FIG. 7.

Finally, in the step S414, the map matching device 114 sends the position and the azimuth of the position calculation apparatus 100, the position, the azimuth, and the link number of the first candidate point, and also the road deviation decision result to the route search device 115 and to the route guidance device 116.

The step S413 (in FIG. 3) of the operational procedure of the position calculation apparatus 100 will now be explained with reference to FIG. 7.

In the step S901, as explained below, hypotheses are formulated as to whether or not there is any distance deviation between the estimated position of the position calculation apparatus 100 and the link.

Null Hypothesis Hp0: There is no distance deviation between the estimated position of the position calculation apparatus 100 and the link.

Alternative Hypothesis Hp1: There is a distance deviation between the estimated position of the position calculation apparatus 100 and the link.

Using Equations (12) through (15), the square of the distance between the estimated position of the position calculation apparatus 100 and of the link is made dimensionless by dividing it by the sum of the error covariance Σpe of the estimated position of the position calculation apparatus 100 and the error covariance Σpl of the link position, and thereby a test statistic Tp is calculated. In Equation (12), the distance between the estimated position of the position calculation apparatus 100 and the link (i.e. the difference in their positions) is specified by the positional data Δx and Δy.

[Equation 12]
$$T_p = [\Delta x \quad \Delta y(i)] \sum_{p}^{-1} \begin{bmatrix} \Delta x \\ \Delta y \end{bmatrix} \quad (12)$$

[Equation 13]
$$\begin{bmatrix} \Delta x \\ \Delta y \end{bmatrix} = \begin{bmatrix} x_e \\ y_e \end{bmatrix} - \begin{bmatrix} x_l \\ y_l \end{bmatrix} \quad (13)$$

[Equation 14]
$$\sum_{p} = \sum_{pe} + \sum_{pl} \quad (14)$$

[Equation 15]
$$\sum_{pl} = \begin{bmatrix} \sigma_{pl} \sin \theta_l & 0 \\ 0 & \sigma_{pl} \cos \theta_l \end{bmatrix} \quad (15)$$

If it is hypothesized that the error in the estimated position of the position calculation apparatus 100 and the error in the link position follow normal distributions, then the test statistic Tp follows a chi-squared distribution having one degree of freedom. This one degree of freedom is based upon the single parameter of position (i.e. distance). Thus, if a statistical significance of α is set, and testing with respect to this hypothesis is performed based upon a chi-squared distribution having one degree of freedom, then the validity of these hypotheses can be determined as described below. If the test statistic Tp is less than or equal to the chi-squared value of one degree of freedom and statistical significance α, then the null hypothesis Hp0 cannot be rejected, and it is decided that there is no distance difference between the estimated position of the subject vehicle and the link. But if the test statistic Tp is greater than or equal to the chi-squared value of freedom 1 and statistical significance α, then the null hypothesis Hp0 is rejected, and it is decided that there is a distance difference between the estimated position of the subject vehicle and the link.

In the step S902, as explained below, hypotheses are formulated as to whether or not there is any deviation between the estimated azimuth of the position calculation apparatus 100 and azimuth of the link.

Null Hypothesis Hθ0: There is no deviation between the estimated azimuth of the position calculation apparatus 100 and the azimuth of the link.

Alternative Hypothesis Hθ1: There is a deviation between the estimated azimuth of the position calculation apparatus 100 and the azimuth of the link.

Using Equations (16) through (18), the azimuthal difference between the estimated azimuth of the position calculation apparatus 100 and the link azimuth is made dimensionless by dividing it by the square root of the sum of the square of the error covariance (σθe) of the estimated azimuth of the position calculation apparatus 100 and the square of the error covariance (σθl) of the link position, and thereby a test statistic Tθ is calculated. In Equation (16), the difference between the estimated azimuth of the position calculation apparatus 100 and the azimuth of the link candidate point is denoted by Δθ.

[Equation 16]
$$T_\theta = \frac{\Delta\theta}{\sigma_\theta} \quad (16)$$

[Equation 17]
$$\Delta\theta = \theta_e - \theta_l \quad (17)$$

[Equation 18]
$$\sigma_\theta^2 = \sigma_\theta^2 + \sigma_{\theta l}^2 \quad (18)$$

If it is hypothesized that the error in the estimated azimuth of the position calculation apparatus 100 and the error in the link azimuth follow normal distributions, then the test statistic Tθ follows a normal distribution. Thus, if a statistical significance of α is set, and a two-sided test with respect to this hypothesis is performed based upon a normal distribution, then the validity of these hypotheses can be determined as described below. If the test statistic Tθ is less than or equal to the value in the normal distribution of statistical significance α, then the null hypothesis Hθ0 cannot be rejected, and it is decided that there is no difference between the estimated azimuth of the subject vehicle and the azimuth of the link. But if the test statistic Tθ is greater than or equal to the value in the normal distribution of statistical significance α, then the null hypothesis Hθ0 is rejected, and it is decided that there is a difference between the estimated azimuth of the subject vehicle and the azimuth of the link.

In the step S903, it is decided that the mobile object has entered into an underground parking facility if all of the conditions (a-1) through (a-3) described below are satisfied.
(a-1) The distance between the position calculation apparatus 100 and the first link candidate point is greater than or equal to a predetermined distance.
(a-2) The number of visible satellites received by the reception device 101 is zero.
(a-3) The link attribute of the first link candidate point is not "tunnel".

And, in the step S903, it is decided that the vehicle has left the underground parking facility, if either of the conditions (b-1) and (b-2) described below is satisfied.
(b-1) The number of visible satellites received by the reception device 101 is one or more.
(b-2) The link attribute of the first link candidate point is "tunnel".

In the step S903, in any case other than those described above, the decision result during the previous cycle is taken as the decision result in this cycle.

In the step S904, it is decided that the vehicle has deviated from the road if any one of the conditions (c-1) through (c-3) described below is satisfied. In any other case, it is decided that the vehicle is traveling upon the road.

(c-1) There is some difference in distance between the estimated position of the position calculation apparatus 100 and the link.
(c-2) There is some difference between the estimated azimuth of the position calculation apparatus 100 and the link azimuth.
(c-3) The position calculation apparatus 100 is in an underground parking facility.

In the step S905, if it was decided in the step S904 that the vehicle has deviated from the road, then the flow of control is transferred to the step S908. But if this is not the case, then the flow of control is transferred to the step S414.

And, in the step S906, it is decided that the vehicle is in a parking facility, if either of the conditions (d-1) and (d-2) described below is satisfied. In any other case, it is decided that the vehicle has left the parking facility.
(d-1) It has been decided that the position calculation apparatus 100 is in an underground parking facility.
(d-2) The distance between the position calculation apparatus 100 and the first link candidate point is greater than or equal to a predetermined distance.

And, in the step S907, if it has been decided that the vehicle is in a parking facility, then the flow of control proceeds to the step S908. But if this is not the case, then the flow of control is transferred to the step S414.

In the step S908, while keeping the current position and azimuth of the link candidate point, the other length series data in the past are deleted, so that the amount of length series data becomes one.

The step S207 (in FIG. 3) of the operational procedure of the position calculation apparatus 100 will now be explained with reference to FIG. 8.

In the step S1001, the map accuracy calculation device 117 receives the variance of the error of the estimated position from the position measurement and calculation device 113, and also receives the road deviation decision result from the map matching device 114. If the road deviation decision result is that the vehicle is traveling upon the road, in other words that it has not deviated from the road, and also the variance of the error of the estimated position is less than or equal to a threshold value, then the flow of control proceeds to the step S1002, whereas in any other case the flow of control is transferred to the step S1004.

In the step S1002, the map accuracy calculation device 117 receives the estimated position from the position measurement and calculation device 113, and also receives the position of the first link candidate point from the map matching device 114. And it calculates the distance between the estimated position and the first link candidate point, and takes this as being the error in the link position at the current position. Here, if the component in the northward direction of the vector from the first link candidate point to the estimated position is positive, in other words if the direction of the vector is in the anticlockwise direction from the eastward direction to the westward direction (including directly east), then the error in the link position is taken as being positive. Moreover, if the component in the northward direction of the vector from the first link candidate point to the estimated position is negative, in other words if the direction of the vector is in the anticlockwise direction from the westward direction to the eastward direction (including directly west), then the error in the link position is taken as being negative.

In the step S1003, the map accuracy calculation device 117 reads in from the map accuracy storage device 108 the count number, the summed value, and the summed value of sums of squares related to errors of link position in a predetermined region including the current position. And the map accuracy calculation device 117 adds the error in the link position at the current position to the summed value of the errors in link position in the predetermined region including the current position, adds the square of the error in the link position at the current position to the summed value of sums of squares of errors in link position in the predetermined region including the current position, and adds one to the count number of errors in link position in the predetermined region including the current position. Then the map accuracy calculation device 117 calculates the average value of the errors in link position by dividing the summed value of errors in link position after the above addition by the count number of errors in link position after the above addition. And it calculates the average value of the squares of the errors in link position by dividing the summed value of sums of squares of the errors in link position after the above addition by the count number of errors in link position after the above addition. Moreover, it calculates the variance of the errors in link position in the predetermined region including the current position by subtracting the square of the average value of the errors in link position from the average value of the squares of the errors in link position. And then the map accuracy calculation device 117 stores the variance, the count number, the summed value, and the summed value of sums of squares related to errors of link position in a predetermined region including the current position in the map accuracy storage device 108.

In the step S1004, the map accuracy calculation device 117 receives the variance of the error of the estimated azimuth from the position measurement and calculation device 113. If the road deviation decision result is that the vehicle is traveling upon the road, in other words that it has not deviated from the road, and also the variance of the error of the estimated azimuth is less than or equal to a threshold value, then the flow of control proceeds to the step S1004, whereas in any other case the flow of control is transferred to the step S208.

In the step S1005, the map accuracy calculation device 117 receives the estimated azimuth from the position measurement and calculation device 113, and also receives the azimuth of the first link candidate point from the map matching device 114. And it calculates the difference between the estimated azimuth and the azimuth of the first link candidate point, and takes this as being the error in the link azimuth at the current position.

In the step S1006, the map accuracy calculation device 117 reads in from the map accuracy storage device 108 the count number, the summed value, and the summed value of sums of squares related to errors of link azimuth in a predetermined region that includes the current position. And the map accuracy calculation device 117 adds the error in the link azimuth at the current position to the summed value of the errors in link azimuth in the predetermined region including the current position, adds the square of the error in the link azimuth at the current position to the summed value of sums of squares of errors in link azimuth in the predetermined region including the current position, and adds one to the count number of errors of link azimuth in the predetermined region including the current position. Then the map accuracy calculation device 117 calculates the average value of the errors in link azimuth by dividing the summed value of errors in link azimuth after the above addition by the count number of errors in link azimuth after the above addition. And it calculates the average value of the square of the errors in link azimuth by dividing the summed value of sums of squares of the errors in link azimuth after the above addition by the count number of the errors in link azimuth after the above addition. Moreover, it calculates the variance of the errors in link azimuth in the predetermined region including the current position by subtracting the square of the average value of the errors in link azimuth from the average value of the squares of the errors in link azimuth. And then the map accuracy calculation device 117 stores the variance, the count number, the summed value, and the summed value of sums of squares related to errors of link azimuth in a predetermined region including the current position in the map accuracy storage device 108.

The position calculation apparatus of this embodiment as explained above provides the following beneficial operational effects.

(1) The errors in the link data in the map are different for each region and for each map maker. Due to this fact, with map matching in which no consideration is given to map errors, or with map matching in which it is supposed that the map errors are constant, sometimes it happens that an error occurs in a decision as to whether or not the vehicle has deviated from a road. For example, if the actual error variance in the links is larger than supposed, then it may frequently happen that, even though the vehicle is traveling upon some road, the link is not included within the supposed range, and a decision is mistakenly made that the vehicle has deviated from that road, and this is undesirable. Moreover, if the actual error variance in the links is smaller than supposed, then it may frequently happen that, even though the vehicle has deviated from some road, the link is included within the supposed range, and matching to the link is mistakenly performed, and this is also undesirable. According to the operational procedure of the position calculation apparatus 100 of this embodiment (see FIGS. 2, 3, 7, and 8), when the errors in the estimated position and in the estimated azimuth are less than or equal to their threshold values, in other words when the accuracy is good, the variances of the errors in the positions and the azimuths of the links in the predetermined region that includes the current position are calculated based upon the estimated position and the estimated azimuth, and also based upon the link positions and the link azimuths. Due to this, even though the link errors in the map are different for each region and for each map maker, it is still possible to perform map matching using accurate error variances of link positions and azimuths, and it is thus possible to reduce the error in road deviation decision.

(2) Based upon the differences between the position of the position calculation apparatus 100 and the positions and the distances of the link candidate points, and the differences between the azimuth of the position calculation apparatus 100 and the azimuths of the link candidate points, the levels of agreement for the length series data between the position and the azimuth of the position calculation apparatus 100 and the positions and the azimuths of the link candidate points are calculated as being the evaluation values, and the first link candidate point is selected. Since this selection technique is based upon routes in the past, accordingly it is possible to prevent mistaken matching just before road junctions. However, according to the prior art, in a case such as the narrow angle road fork shown in FIG. 9, in some cases it may happen that mistaken matching to a link may take place. In FIG. 9, the link 1100 forks off into the links 1104 and 1105. The mobile object actually travels along the link 1100 and then along the link 1104. Sometimes it may happen that, due to the influence of errors in the position and the azimuth of the link 1104 directly after its forking off from the link 1100, and also due to the positional error of the position 1101 of the position calculation apparatus 100 (i.e. of the detected position of the mobile object), the difference between the detected position of the mobile object, that directly after the road junction is actually traveling upon the link 1104, and the distance and the azimuth of the link 1105 directly after the forking of the road, upon which the mobile object is not actually traveling, becomes smaller than the difference between the detected position of the mobile object and the distance and the azimuth of the link 1104. Due to this, an erroneous link candidate point upon the link 1105 along which the mobile object is not traveling is determined as being the first link candidate point 1103a, and this is undesirable; and, if the set of length series data is long, then, due to the influence of the difference between the detected position 1101 of the mobile object directly after the road fork and the influence of the distance and azimuth of the link 1104, the link candidate point 1102 upon the correct link 1104 is not selected even after the vehicle has been traveling on that link 1104 for some time.

However, according to the operational procedure of the position calculation apparatus 100 of this embodiment (refer to FIGS. 2, 3, 7, and 8), in the step S409, the map matching device 114 reduces the amount of length series data that is used in the calculation of the evaluation values, as long as the distance between the link 1104 and the link 1105 after forking off at less than or equal to some predetermined angle remains less than or equal to some predetermined distance. The amount C of length series data as shown in FIGS. 9 and 10 is equivalent to the number of detected positions 1101 of the mobile object. In FIGS. 9 and 10, while the amounts C of length series data during travel by the mobile object along the link 1100 before the road forks are the same, and for example may be 50 data items, the amount C of length series data after the vehicle has passed through the road fork point is different in FIG. 9 and in FIG. 10: for example, in FIG. 10, it may be reduced from 50 data items to three data items. By doing this, and by using as little length series data as possible in the calculation of the evaluation values directly after the forking of the road, it is possible, as shown in FIG. 10, quickly to eliminate the influence of errors in the position and in the azimuth of the link 1104 directly after the road junction, and also to eliminate the influence of positional errors in the detected position 1101 of the mobile object, so that it is possible quickly to determine upon the correct link candidate point 1103b.

In other words, when calculating the evaluation values based upon the length series data that includes the distances between the estimated position and the links, the differences between the estimated azimuth and the azimuths of the links, the estimated position, the link positions, and the error covariance of the estimated azimuth and the link azimuths, the amount of length series data is reduced after the road fork, i.e. as little length series data as possible is used in the calculation of the evaluation values directly after the road fork. Due to this, it is possible to eliminate the influence of evaluation values that might cause a mismatch directly after a road fork, due to errors in the estimated position, the link positions, the estimated azimuth, and the azimuths of the links. Accordingly, even if an erroneous link candidate point is selected after a road fork, it is still possible quickly to revert to the correct link candidate point.

(3) According to the operational procedure of the position calculation apparatus 100 of this embodiment (refer to FIGS. 2, 3, 7, and 8), in the step S410, the distances between the position of the position calculation apparatus 100 and the positions of the link candidate points, and the differences between the azimuth of the position calculation apparatus 100 and the azimuths of the link candidate points, are divided by their covariance matrixes. They are made dimensionless by doing this, and accordingly it is possible to add together the distances and the azimuths in a statistically correct manner in order to calculate the evaluation values by adding the terms for position and azimuth, it is possible to use the results in the determination of the first link candidate, and it is possible to perform determination of errors in the positions and the azimuths and the probability of their existence with accuracy that may be considered to be high. Moreover, if it is hypothesized that the error covariances of the position and the azimuth of the position calculation apparatus 100 and of the link candidate points follow normal distributions, then the evaluation values will follow a chi-squared distribution of 2×n degrees of freedom. Due to this, when the evaluation values are substituted into the probability density function of this chi-squared distribution of 2×n degrees of freedom, it is possible to convert the probability that these values of differences, calculated from the position and the azimuth of the position calculation apparatus and the positions and azimuths of the link candidate points, have occurred while the position calculation apparatus is traveling along some road (i.e. along some link), in other words into a probability of their existence in consideration of the differences in position and in azimuth. To put it in another manner, it can be converted into the probability that the position calculation apparatus is traveling along that road (i.e. along that link).

(4) With this technique that employs evaluation values for which variables whose units are different, i.e. distance and azimuth, are multiplied by experimental coefficients and are added together, in order to enhance the accuracy of determination of the correct link candidate, it is necessary to deduce values for the coefficients by traveling through a large number of road forks and to use the data that is gathered in this way, so that a long time period is inevitably consumed in development. However, according to the operational procedure of the position calculation apparatus 100 of this embodiment (refer to FIGS. 2, 3, 7, and 8), the error variances of the positions and azimuths of the links are calculated in the step S207, and these error variances are used in the step S410 for calculation of the evaluation values, so that the first link candidate point can be determined in the step S412. Due to this, it becomes unnecessary to travel through a large number of road forks in order to gather data, so that it is possible to complete development within a short period of time.

(5) According to the operational procedure of the position calculation apparatus 100 of this embodiment (refer to FIGS. 2, 3, 7, and 8), in the step S901 and the step S902, using hypothesis testing, a decision is made as to whether or not there are differences between the position and the azimuth of the position calculation apparatus 100 and the positions and azimuths of the links. Since, by performing the decision in this manner, consideration is given to errors in the position and azimuth of the position calculation apparatus 100, to errors in the positions and the azimuths of the links, and to the probability of presence of the position calculation apparatus 100, accordingly it is possible to make the road deviation decision in a statistically correct manner and with high accuracy.

(6) With this technique in which the decision as to deviation from the road is performed based upon values of variables whose units are different, i.e. distance and azimuth, and that are multiplied by experimental coefficients and are added together, in order to enhance the accuracy of determination of deviation from the road, it is necessary to deduce values for the coefficients by traveling through a large number of road forks and to use the data that is gathered in this way, so that a long time period is inevitably consumed in development. However, according to the operational procedure of the position calculation apparatus 100 of this embodiment (refer to FIGS. 2, 3, 7, and 8), the error variances of the positions and the azimuths of the links are calculated in the step S207, and those error variances are used in the step S901 and the step S902 for calculation of the evaluation values, and a decision is made as to whether or not there are any differences in position and azimuth between the estimation values and the position and the azimuth of the first link candidate point. By performing the decision in this manner, it becomes unnecessary to travel through a large number of road forks in order to gather data, so that it is possible to complete development within a short period of time.

Figure 11:
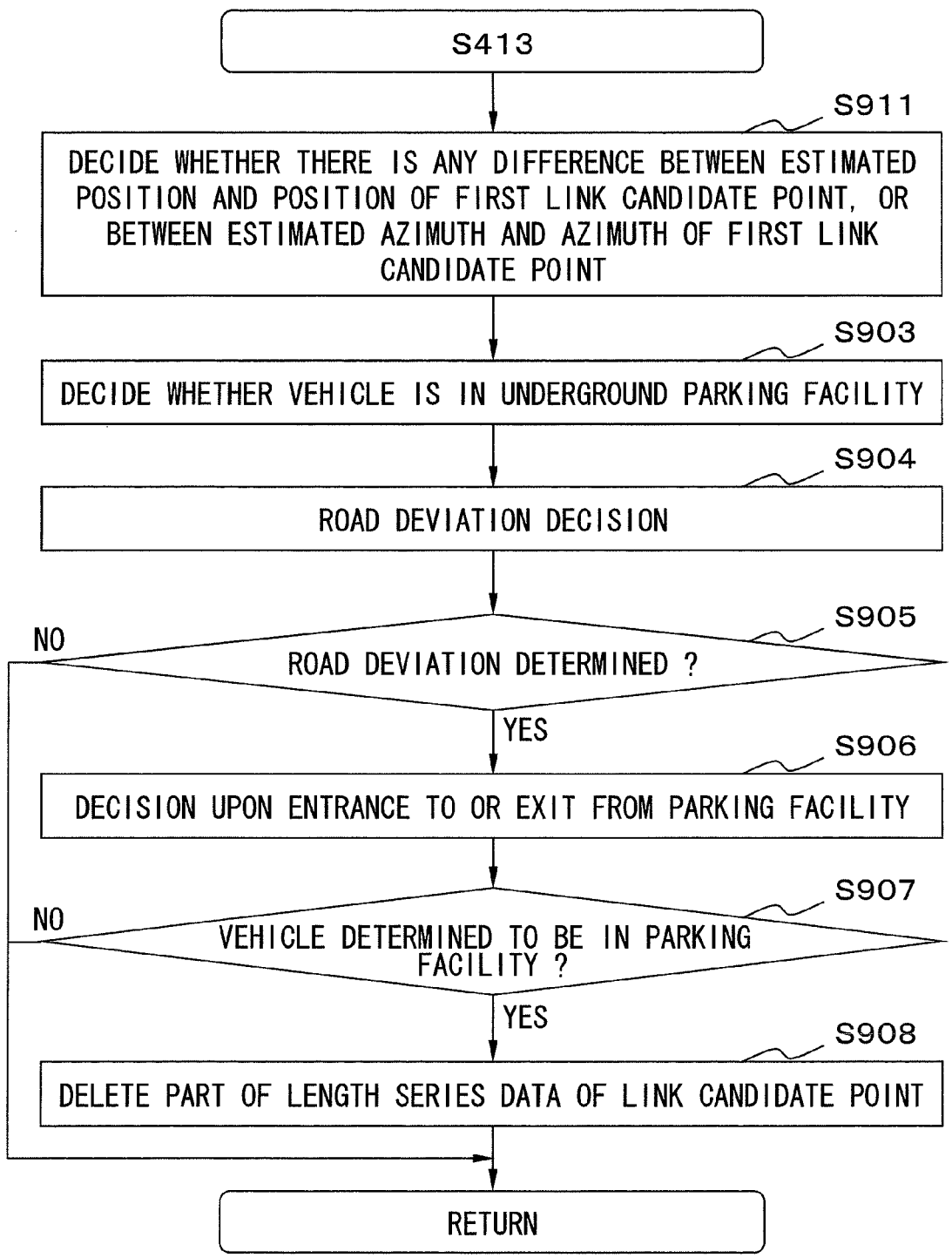
FIG. 11 is a figure showing operation of a position calculation apparatus for road deviation decision processing.

-Variant Embodiments- (1) In the operational procedure of the position calculation apparatus 100 shown in FIG. 1 (refer to FIGS. 2, 3, 7, and 8), instead of the step S901 and the step S902, it would also be acceptable to provide the step S911 as shown in FIG. 11, and to formulate the hypotheses described below. It should be understood that, since the step S903 that follows after the step S911 in FIG. 11 and subsequent steps are the same as in FIG. 7, accordingly explanation thereof will be omitted.

Null Hypothesis Hpθ0: There is no distance deviation between the estimated position of the position calculation apparatus 100 and the link, and there is no difference between the estimated azimuth of the position calculation apparatus 100 and the azimuth of the link.

Alternative Hypothesis Hpθ1: There is a distance deviation between the estimated position of the position calculation apparatus 100 and the link, or there is a difference between the estimated azimuth of the position calculation apparatus 100 and the azimuth of the link.

Using Equation (19), a test statistic Tpθ is calculated by adding together the square of the distance between the estimated position of the position calculation apparatus 100 and the link and the square of the azimuthal difference between the estimated azimuth of the position calculation apparatus 100 and the azimuth of the link, after having respectively made them dimensionless by dividing them by the error covariance of the position data that specifies the distance and by the variance of the azimuthal difference data that specifies the azimuthal difference. In Equation (19), the distance between the estimated position of the position calculation apparatus 100 and the link is expressed by the differences Δx and Δy of the positional data, and the azimuthal difference between the estimated azimuth of the position calculation apparatus 100 and the azimuth of the link is expressed by the azimuthal difference data Δθ. Equation (19) is an equation that relates to one item of length series data, while Equation (8) is an additive equation that relates to n items of length series data.

[Equation 19]

$$T_{p\theta} = [\Delta x \ \Delta y \ \Delta \theta] \sum_d {}^{-1} \begin{bmatrix} \Delta x \\ \Delta y \\ \Delta \theta \end{bmatrix} \quad (19)$$

If it is hypothesized that the error covariances of the position and the azimuth of the position calculation apparatus 100 and the link candidate points follow normal distributions, then the test statistic Tpθ follows a chi-squared distribution having two degrees of freedom. This two degrees of freedom is based upon the two parameters of position (i.e. distance) and azimuth. Thus, if a statistical significance of α is set, and testing with respect to the above hypotheses is performed based upon a chi-squared distribution, then the validity of these hypotheses can be determined as described below. If the test statistic Tpθ is less than or equal to the chi-squared value of statistical significance α, then the null hypothesis cannot be rejected, and it is decided that there is no distance between the estimated position of the position calculation apparatus 100 and the link, and that there is no difference between the estimated azimuth of the position calculation apparatus 100 and the azimuth of the link. But if the test statistic Tpθ is greater than the chi-squared value of statistical significance α, then the null hypothesis is rejected, and it is decided that there is a distance between the estimated position of the position calculation apparatus 100 and the link, or there is a difference between the estimated azimuth of the position calculation apparatus 100 and the azimuth of the link. Due to the above, it is possible to make the road deviation decision in a statistically correct manner and with high accuracy, in consideration of the probability that errors may exist in the positions and the azimuths of the position calculation apparatus 100 and of the link candidate points.

(2) In the operational procedure of the position calculation apparatus 100 shown in FIG. 1 (refer to FIGS. 2, 3, 7, and 8), in the step S201, the reception device 101 calculates an HDOP (Horizontal Dilution Position) based upon the positions of a plurality of the position measurement satellites and the reception position, and sends the result to the reception anomaly determination device 112. And in the step S207 the map accuracy calculation device 117 receives, from the reception anomaly determination device 112, the reception position and the reception azimuth, the anomaly decision result for those, and also the HDOP, and furthermore receives the road deviation decision result and the position and the azimuth of the first link candidate point from the map matching device 114. Moreover, the map accuracy calculation device 117 reads in from the map accuracy storage device 108 the count numbers, the summed values, and the summed values of sums of squares related to each of the errors in the link positions and the errors in their azimuths in the predetermined region that includes the reception position. If it is decided that there is no deviation, and moreover it is decided that there is no anomaly in the reception position, and if further the HDOP is less than or equal to a threshold value, then the vector from the first link candidate point to the reception position is calculated, the sign of this vector is determined from its component in the northward direction, and the error in the link position at the current position is calculated from the magnitude of the vector and its sign. The error in the link position and its square are respectively added to the summed value and to the summed value of sums of squares of the errors in link positions in the predetermined region including the current position, and one is added to the count number of errors in link positions in the predetermined region that includes the current position. And the variance of the errors in link position in the predetermined region that includes the current position is calculated from the summed value of the errors in link position, the summed value of their sums of squares, and the count number thereof.

Furthermore, if it is decided that there is no deviation, and moreover it is decided that there is no anomaly in the reception azimuth, and if moreover the HDOP is less than or equal to the threshold value, then the difference between the reception azimuth and the azimuth of the first link candidate point is taken as being the error in the link azimuth at the current position. The error in the link azimuth at the current position and its square are respectively added to the summed value and to the summed value of sums of squares of the errors in link azimuths in the predetermined region including the current position, and one is added to the count number of errors in link azimuths in the predetermined region that includes the current position. And the variance of the errors in link azimuth in the predetermined region that includes the current position is calculated from the summed value of the errors in link azimuth, the summed value of their sums of squares, and the count number thereof. And the map accuracy calculation device 117 stores the variances, the count numbers, the summed values, and the summed values of sums of squares related to errors in the link positions and the errors in their azimuths in the predetermined region that includes the current position in the map accuracy storage device 108. Since, by doing this, the error variances for the link positions and the link azimuths are calculated based upon the reception position and the reception azimuth when the accuracy of the reception position and the reception azimuth is good, accordingly it is possible to perform the map matching using the accurate error variances of the link positions and azimuths, so that it is possible to make a correct decision related to deviation from the road.

(3) In the operational procedure of the position calculation apparatus 100 shown in FIG. 1 (refer to FIGS. 2, 3, 7, and 8), instead of the step S409, it would also be acceptable to perform the following processing. FIG. 12 is a figure showing a situation after, by the following processing instead of the step S409, the first link candidate point 1301 in the previous cycle (after having been shifted forward) has passed through a road fork at less than or equal to a predetermined angle. The link 1300 at the road forking point forks off into links 1303 and 1305, and the link 1303 is connected to a link 1304 by a node 1307. On the other hand, the link 1305 is connected to a link 1306 by a node 1308. As shown in FIG. 12, if the first link candidate point 1301 (after having been shifted forward) or the link candidate point 1302 is upon either of the first links 1303 or 1305 after the road fork at less than or equal to the predetermined angle, then the amount of length series data is set to the second predetermined number that is smaller than the normal first predetermined number. If the first link candidate point 1301 or the link candidate point 1302 is upon either of the second links 1304 or 1306 or a later one after the road fork at less than or equal to the predetermined angle, then the amount of length series data is set to an amount of length series data starting from a link among the second and subsequent links, while taking the normal first predetermined number as an upper limit and the second predetermined number as a lower limit. In other words, when the first link candidate point 1301 or the link candidate point 1302 is upon the second or subsequent link after the road fork at less than or equal to the predetermined angle, then the amount of length series data that is used in the calculation of the evaluation values is set according to the amount of length series data starting from a link among the second and subsequent links. If the amount of length series data starting from the link among the second and subsequent links is greater than the first predetermined number, then the first predetermined number is set for the amount of length series data that is used in the calculation of the evaluation values; while, if the amount of length series data starting from the link among the second and subsequent links is less than the second predetermined number, then the second predetermined number is set for the amount of length series data that is used in the calculation of the evaluation values. In any other case, the amount of length series data that is used in the calculation of the evaluation values is set to the amount of length series data starting from the link among the second and subsequent links. By doing this, it is possible quickly to eliminate the influence of errors in the positions and the azimuths of the links directly after the road fork, and also the influence of error in the position of the position calculation apparatus 100, and it is possible to determine the correct link candidate point quickly.

(4) FIG. 13 is a figure showing a situation after, by the following processing instead of the step S409 and the step S413, the first link candidate point 1401 in the previous cycle (after having been shifted forward) has passed through a road fork at less than or equal to a predetermined angle. In the operational procedure of the position calculation apparatus 100 shown in FIG. 1 (refer to FIGS. 2, 3, 7, and 8), instead of the step S413, the following processing is performed. That is, along with making a road deviation decision for the first link candidate point, if, after a road fork at less than or equal to a predetermined angle, there is a link candidate point upon the link that has forked off that is different from the first link candidate point, then a road deviation decision is also made for that link candidate point. Moreover, instead of the step S409, the following processing is performed. That is if, after the first link candidate point in the previous cycle 1401 (after having been shifted forward) has passed through the road fork 1400 at less than or equal to the predetermined angle, it has been decided that the vehicle is upon the road, the vehicle being assumed to be traveling through a link candidate point 1402 (hereinafter termed the "fork link candidate point") upon one road fork link 1411 that forked off at the road fork 1400, then the amount of length series data that is used in the calculation of the evaluation values is set to a second predetermined number that is smaller than the normal first predetermined number. And if, after the first link candidate point 1401 has passed through the road fork 1400 at less than or equal to the predetermined angle, it has been decided that there is the road deviation at a road fork link candidate point 1403 upon the other road fork link 1412 that forked off at the road fork 1400, then it would be acceptable to set the amount of length series data that is used in the calculation of the evaluation values to the amount of length series data from the location at which the decision of road deviation was made, while taking the normal first predetermined number as an upper limit for the amount of length series data and a second predetermined number as a lower limit. By doing this, it is possible quickly to eliminate the influence of errors in the position and the azimuth of the links directly after the road fork, and also the influence of errors in the position of the position calculation apparatus 100, so that it is possible to determine the correct link candidate point quickly.

Figure 14:
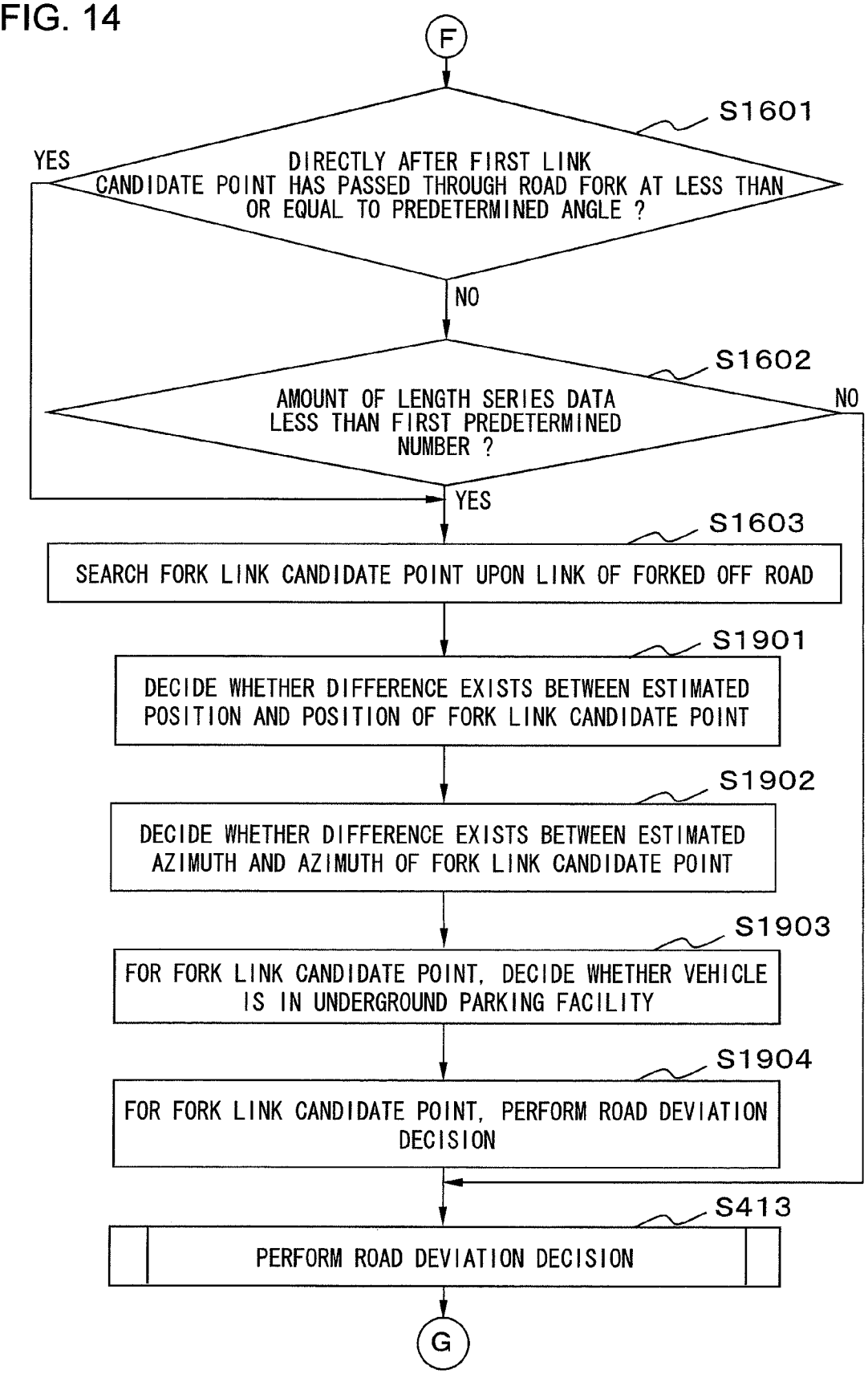
FIG. 14 is a figure showing operation of a position calculation apparatus for road deviation decision processing.
Figure 15:
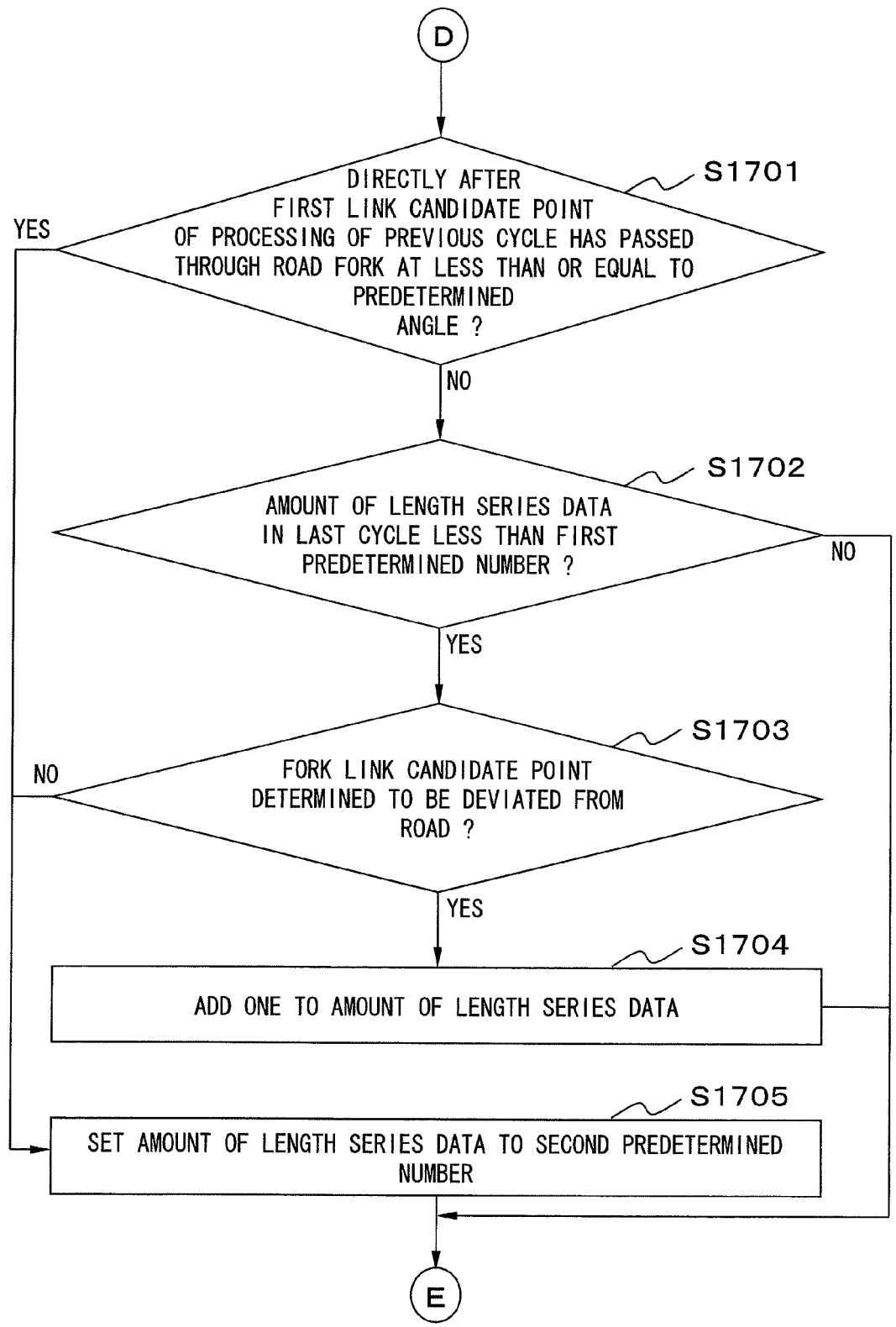
FIG. 15 is a figure showing operation of a position calculation apparatus for processing to set an amount of length series data.

In concrete terms, instead of the step S413 and the step S409, processing is performed as shown in FIGS. 14 and 15. The steps S1601 through S1603, S1901 through S1904, and S413, that replace the step S413 (in FIG. 3) of the operational procedure of the position calculation apparatus 100 shown in FIG. 1, will now be explained with reference to FIG. 14.

In the first step S1601, if, after the predetermined distance mentioned in the step S407 from the first link candidate point 1401, there is a road fork at less than or equal to the predetermined angle, then it is decided that this is directly after the first link candidate point 1401 has passed through a road fork at less than or equal to a predetermined angle, and the flow of control is transferred to the step S1603. But if this is not the case, then it is decided that this is not directly after the first link candidate point has passed through a road fork at less than or equal to a predetermined angle, and the flow of control proceeds to the step S1602.

In the step S1602, if the amount of length series data is less than the first predetermined number, then it is decided that there is a fork link candidate point upon the link that has forked off that is different from the first link candidate point 1401, and the flow of control proceeds to the step S1603. But if this is not the case, then the flow of control is transferred to the step S413.

In the step S1603, the forked off link that is different from the link of the first link candidate point 1401 is specified, and a fork link candidate point that is upon that link is found.

Figure 7:
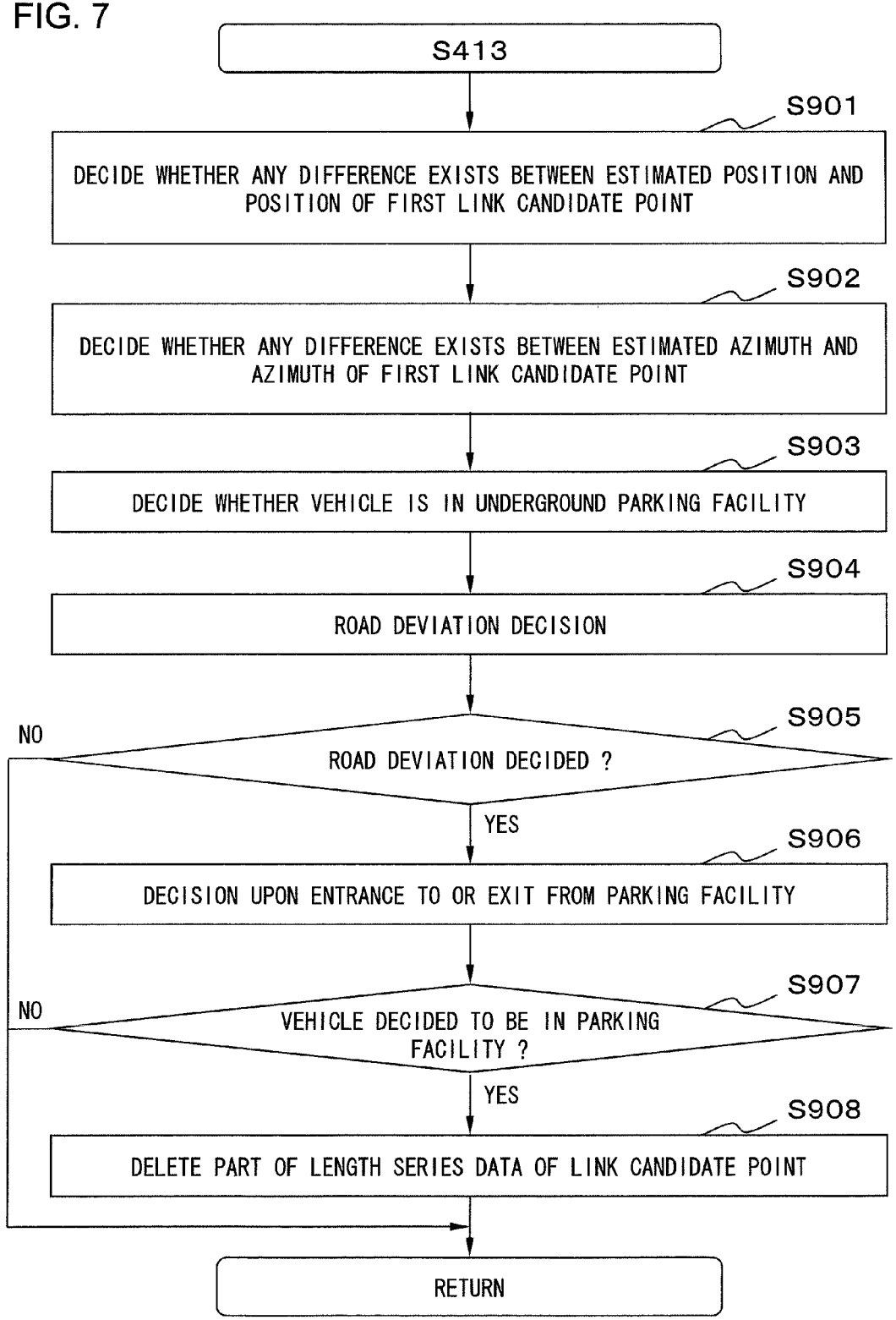
FIG. 7 is a figure showing operation of the position calculation apparatus for road deviation decision processing.

In the step S1901, in a similar manner to the case with the step S901 in FIG. 7, a decision is made as to whether or not there is a difference between the estimated position of the position calculation apparatus 100 and the distance to the road fork link (i.e. as to whether or not there is a difference between the estimated position of the subject vehicle and the position of the fork link candidate point).

In the step S1902, in a similar manner to the case with the step S902 in FIG. 7, a decision is made as to whether or not there is a difference between the estimated azimuth of the position calculation apparatus 100 and the link azimuth of the fork link candidate point.

In the step S1903, in a similar manner to the case with the step S903 in FIG. 7, but using the fork link candidate point instead of the first link candidate point, a decision is made as to whether or not the subject vehicle to which the position calculation apparatus 100 is mounted has entered into an underground parking facility.

In the step S1904, in a similar manner to the case with the step S904 in FIG. 7, a decision is made as to whether or not the situation is one of road deviation. However, the fork link candidate point is used instead of the first link candidate point.

In the step S413, by performing the processing of the steps S901 through S908 shown in FIG. 7, a road deviation decision is performed in relation to the first link candidate point 1401.

The steps S1701 through S1705, that replace the step S409 (in FIG. 3) of the operational procedure of the position calculation apparatus 100 shown in FIG. 1, will now be explained with reference to FIG. 15.

In the step S1701, if there is a road fork at less than or equal to a predetermined angle after the predetermined distance described in the step S407 from the first link candidate point that was advanced forward by the step S406 (i.e. the one that was determined by the processing in the previous cycle), then it is decided that this is directly after the first link candidate point 1401 has passed through the road fork at less or equal to than the predetermined angle, and the flow of control is then transferred to the step S1705. But if this is not the case, then it is decided that this is not directly after it has passed through the road fork at less or equal to than the predetermined angle, and the flow of control proceeds to the step S1702.

In the step S1702, if the amount of length series data for the previous cycle is less than the first predetermined number, then the flow of control proceeds to the step S1703. But if this is not the case, then the flow of control is transferred to the step S410.

Via the processing of the steps S1901 through S1904 of the previous cycle, it is determined in the step S1703 whether or not it has been determined there is a deviation from the road for a fork link candidate point. If it has been determined that there is a road deviation for the fork link candidate point 1403, then the flow of control is transferred to the step S1704. But if it is determined that the vehicle assumed to be upon a fork link candidate point, such as the fork link candidate point 1402, is upon a road, then the flow of control is transferred to the step S1705.

In the step S1704, one is added to the amount of length series data for the previous cycle.

In the step S1705, the amount of length series data is set to the second predetermined number.

Figure 16:
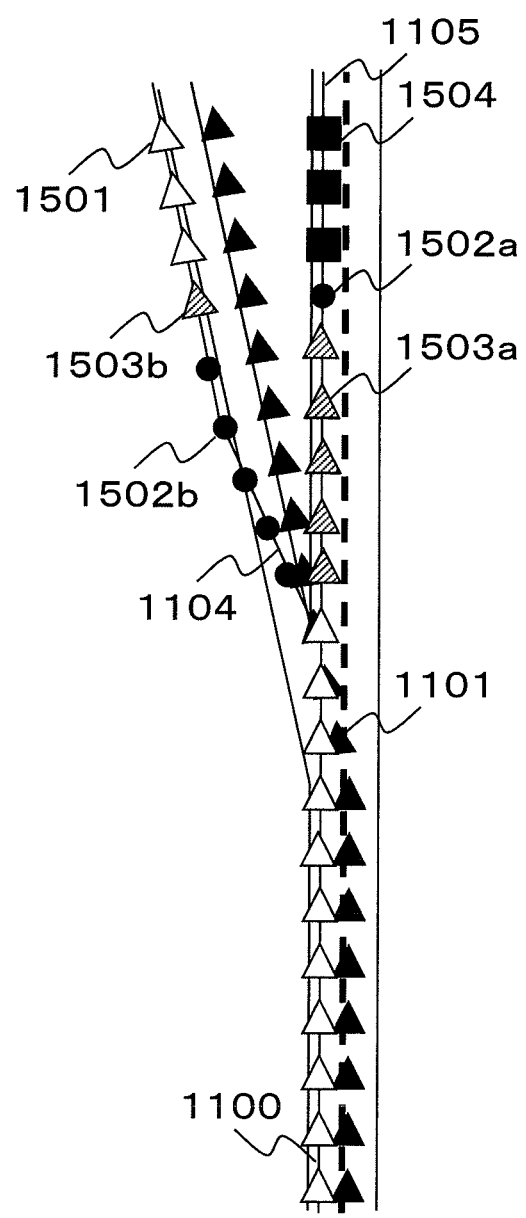
FIG. 16 is a figure for explanation of a display of a first link candidate point directly after a road fork.

(5) According to the fourth variant embodiment (4) described above, for example, in the operational procedure of the position calculation apparatus 100 shown in FIG. 1 (refer to FIGS. 2, 3, 7, and 8), in the step S413, it is possible, after the first link candidate point has passed through a road fork at less than or equal to a predetermined angle, along with performing a road deviation decision for the first link candidate point, also to perform a road deviation decision for the fork link candidate point as well. And if, in the step S213, after the first candidate point has passed through the road fork at less than or equal to the predetermined angle, the result of the deviation determination for the fork link candidate point performed in the step S413 is that the vehicle is traveling along the road, then it would also be possible to change the color of the display for the first link candidate point, so as to make this display appear as different from other cases. Or, it would also be acceptable to make the display of the first link candidate point blink. At this time, for either of the links into which the road forks off, this would mean that this link is one upon which it is considered that there is a possibility that the mobile object may be traveling. In FIG. 16, the display colors for the first link candidate points 1503a and 1503b that are hatched directly after the road fork may be changed, or may be made to blink. Since, by providing a display of this sort, the driver realizes that the position calculation apparatus 100 is still considering the road fork decision, accordingly, even if the first link candidate point is displayed erroneously even though the mobile object is actually positioned at the fork link candidate point, it is nevertheless possible to reduce the misgivings of the driver about this mistake.

Figure 17:
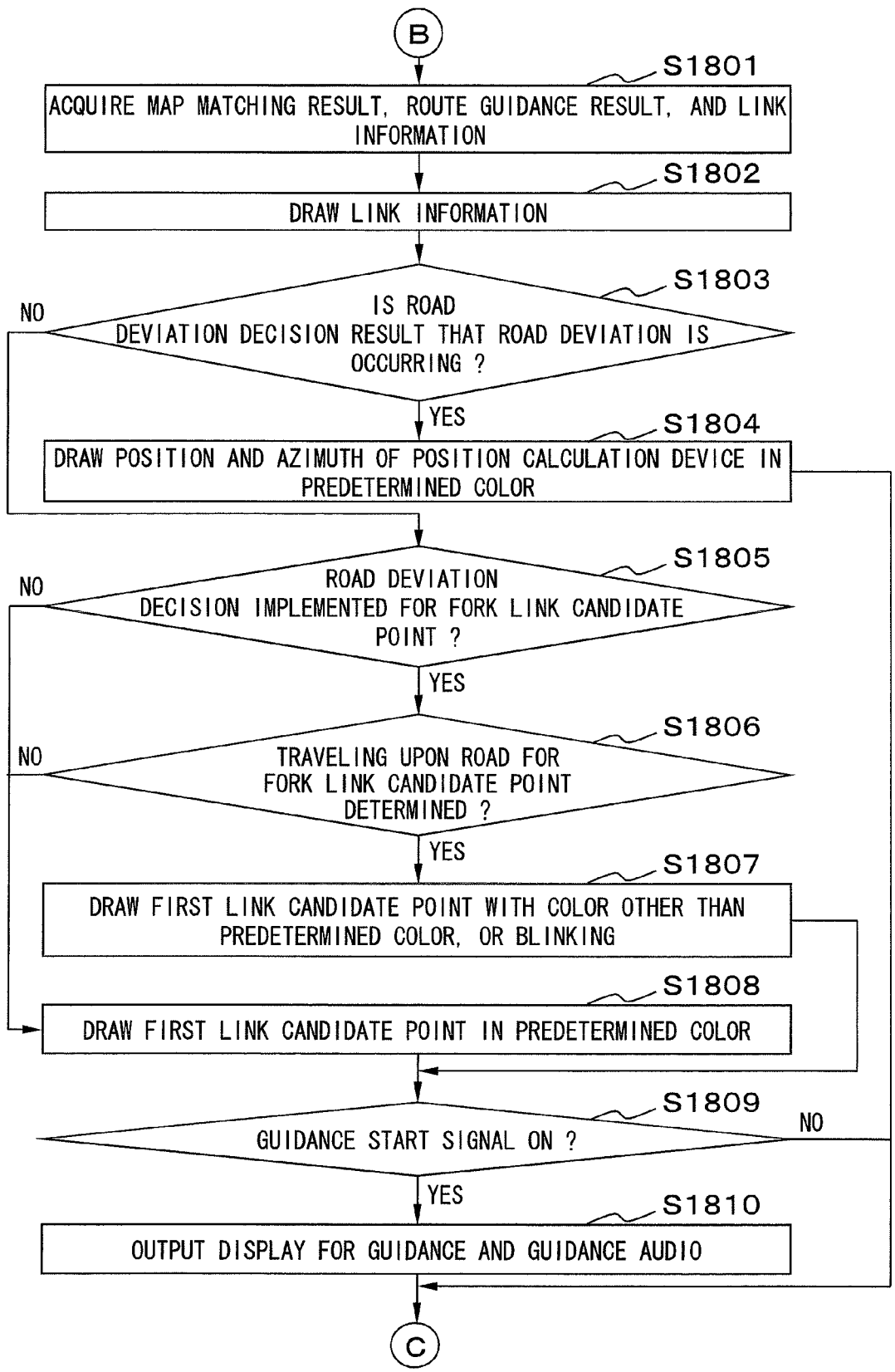
FIG. 17 is a figure showing operation of a position calculation apparatus for processing to output a display and audio.

In concrete terms, instead of the step S413 and the step S409 of the operational procedure of the position calculation apparatus 100 shown in FIG. 1 (refer to FIG. 3), along with performing the processing shown in FIGS. 14 and 15, the processing shown in FIG. 17 is performed, instead of the step S213 of the operation procedure (see FIG. 2) performed by the position calculation apparatus 100 shown in FIG. 1. The steps S1801 through S1810 that are performed instead of the step S213 will now be explained with reference to FIG. 17.

First, in the step S1801, the display and audio output device 107 acquires the position and azimuth of the position calculation apparatus 100, the link number, the position, and the azimuth of the first link candidate point, and also the road deviation decision result from the map matching device 114, and reads in link information for positions around the position calculation apparatus 100 from the map information storage device 106.

In the step S1802, the link information around the position of the position calculation apparatus 100 is drawn upon the screen.

In the step S1803, if it has been decided that the first link candidate point has deviated from the road in the road deviation decision step S413 shown in FIG. 14, then the flow of control proceeds to the step S1804. But if it is determined that the vehicle is traveling along the road, then the flow of control is transferred to the step S1805.

In the step S1804, a car mark of a predetermined color is drawn based upon the position and the azimuth of the position calculation apparatus 100, and then the flow of control is transferred to the step S201.

In the step S1805, a decision is made as to whether or not the fork link candidate point road deviation decision has been implemented. If the road deviation decision for the fork link candidate point has been implemented in the road deviation decision of the steps S1901 through S1904 shown in FIG. 14, then the flow of control proceeds to the step S1806. But if it has not been implemented, then the flow of control is transferred to the step S1808.

In the step S1806, a decision is made as to whether or not traveling upon the road was determined upon in the fork link candidate point road deviation decision. If in the road deviation decision of the steps S1901 through S1904 shown in FIG. 14 it was decided that the fork link candidate point is traveling upon the road, then the flow of control proceeds to the step S1807. In FIG. 16, this corresponds to the link candidate points 1502a and 1502b. But if road deviation is determined, then the flow of control is transferred to the step S1808. In FIG. 16, this corresponds to the link candidate point 1504.

In the step S1807, the position and the azimuth of the first link candidate point are drawn as a car mark having some color other than the abovementioned predetermined color. Or it would also be acceptable to make this car mark blink. In FIG. 16, this corresponds to the first link candidate points 1503a and 1503b.

In the step S1808, the position and the azimuth of the first link candidate point are drawn as a car mark having a predetermined color. In FIG. 16, this corresponds to the first link candidate point 1501.

In the step S1809, the flow of control proceeds to the step S1810 if the guidance start signal is ON, while if it is OFF the flow of control is transferred to the step S201.

In the step S1810, a display for guidance is outputted, and directions for guidance are outputted via audio.

Figure 18:
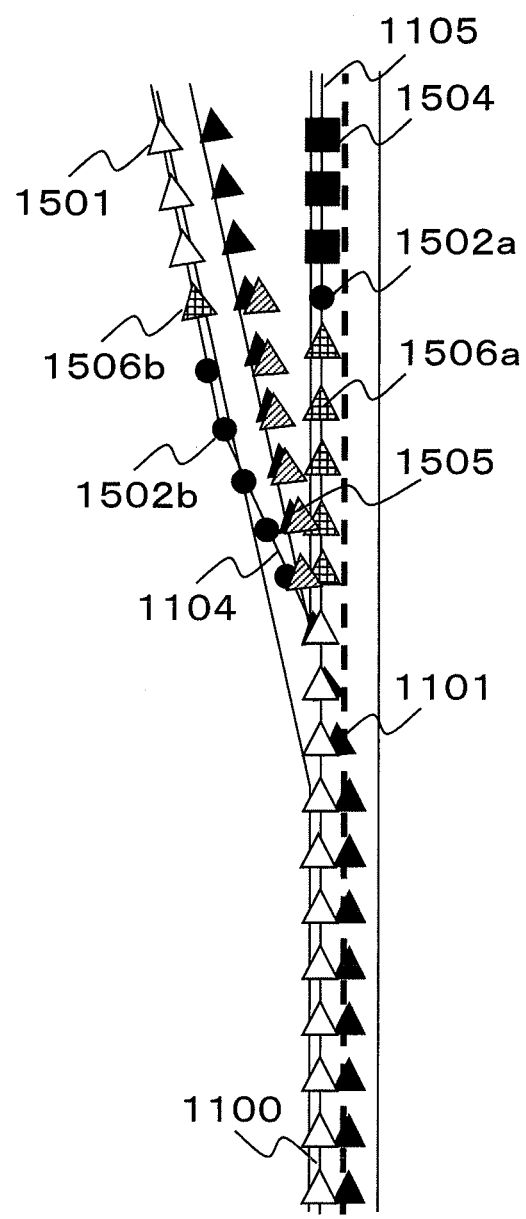
FIG. 18 is a figure for explanation of another display of a first link candidate point directly after a road fork.

(6) According to the fourth variant embodiment (4) described above, for example, in the operational procedure of the position calculation apparatus 100 shown in FIG. 1 (refer to FIGS. 2, 3, 7, and 8), in the step S413, after the first link candidate point has passed through a road fork at less than or equal to a predetermined angle, a road deviation decision is performed for the first link candidate point, and also a road deviation decision is performed for a fork link candidate point upon a forked off link that is different from the first link candidate point. Now, after the first link candidate point has passed through a road fork at less than or equal to a predetermined angle in the step S213, if the result of the deviation decision for the fork link candidate point performed in the step S413 is that the vehicle is traveling upon the road, then it would also be acceptable not to display the position and the azimuth of the first link candidate point, but rather a position for the position calculation apparatus 100 that is between the two links into which the road has forked. Thus, when displaying the position of the position calculation apparatus 100 with a car mark, the azimuth of the car mark is shown as being the average value of the azimuths of the two links. This means that both of the two links into which the road has forked are links upon which it is considered that there is a possibility that the mobile object is traveling. In FIG. 18, the car mark 1505 that is hatched with sloping lines directly after the road fork is displayed between the two links into which the road has forked, and the azimuth of the car mark 1505 is shown as being the average value of the azimuths of the two links. By providing this type of display, if the mobile object is positioned at a fork link candidate point that is different from the first link candidate point, even in this case it is possible to prevent a car mark from being undesirably erroneously displayed at the position and the azimuth of the first link candidate point, and accordingly the driver does not experience any misgivings about a mistake regarding the first link candidate point.

Figure 19:
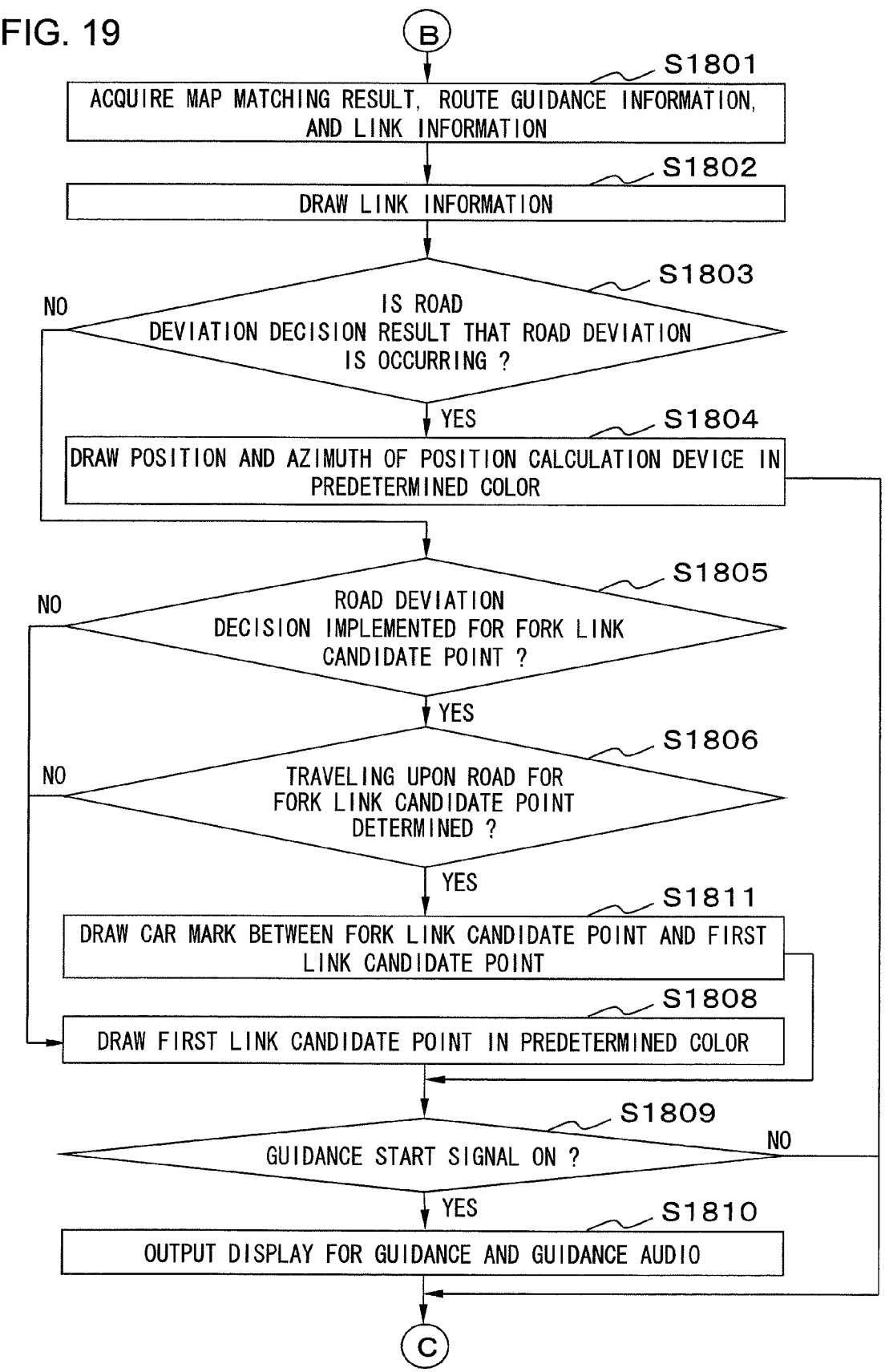
FIG. 19 is a figure showing another type of operation of a position calculation apparatus for processing to output a display and audio.

In concrete terms, instead of the step S413 and the step S409 of the operational procedure of the position calculation apparatus 100 shown in FIG. 1 (refer to FIG. 3), along with the processing shown in FIG. 14 and FIG. 15 being performed, instead of the step S213 of the operational procedure (see FIG. 2) of the position calculation apparatus 100 of FIG. 1 being performed, the processing shown in FIG. 19 is performed. In the operational procedure of FIG. 19, in the steps S1801 through S1810 of the operational procedure of FIG. 17, instead of the step S1807, the step S1811 is implemented. Since the processing of the steps S1801 through S1806 and the processing of the steps S1808 through S1810 have been described above with reference to FIG. 17, here, only the step S1811 that is newly added instead of the step S1807 will be explained in the following description.

In the step S1811, a car mark is drawn located between the fork link candidate point upon the link where the road has forked off that does not include the first link candidate point, and the first link candidate point. Moreover, the azimuth of the car mark is set to a value that is intermediate between the azimuths of the two links. In FIG. 18, this corresponds to the car mark 1505. At this time, the first link candidate points 1506a and 1506b are not displayed. In FIG. 18, portions of the drawing to which the same reference symbols as in FIG. 16 are appended have been described in the explanation of FIG. 16, and accordingly explanation thereof is omitted here.

(7) In the operational procedure of the position calculation apparatus 100 shown in FIG. 1 (refer to FIGS. 2, 3, 7, and 8), in the step S210, it would also be acceptable for the link upon which the first link candidate point is present not to be limited to the case when it is included in the links upon the guidance route. For example even if after passing through a road fork, it is decided that the vehicle is traveling upon a road for the road fork link candidate point upon a fork link that is different from the first link candidate point, then the processing may be changed so as to proceeding to the step S212. By doing this, if an erroneous link candidate point has been taken for the first link candidate point due to an error in link position and azimuth after a road fork, it is possible to prevent searching for a route based upon this erroneous link candidate point being performed again. Moreover since, in consideration of the probability of its presence, route searching is only performed in the state in which it has been decided that the first link candidate point is traveling along the road, accordingly the probability becomes high that searching again for an erroneous route will not be performed.

Figure 20:
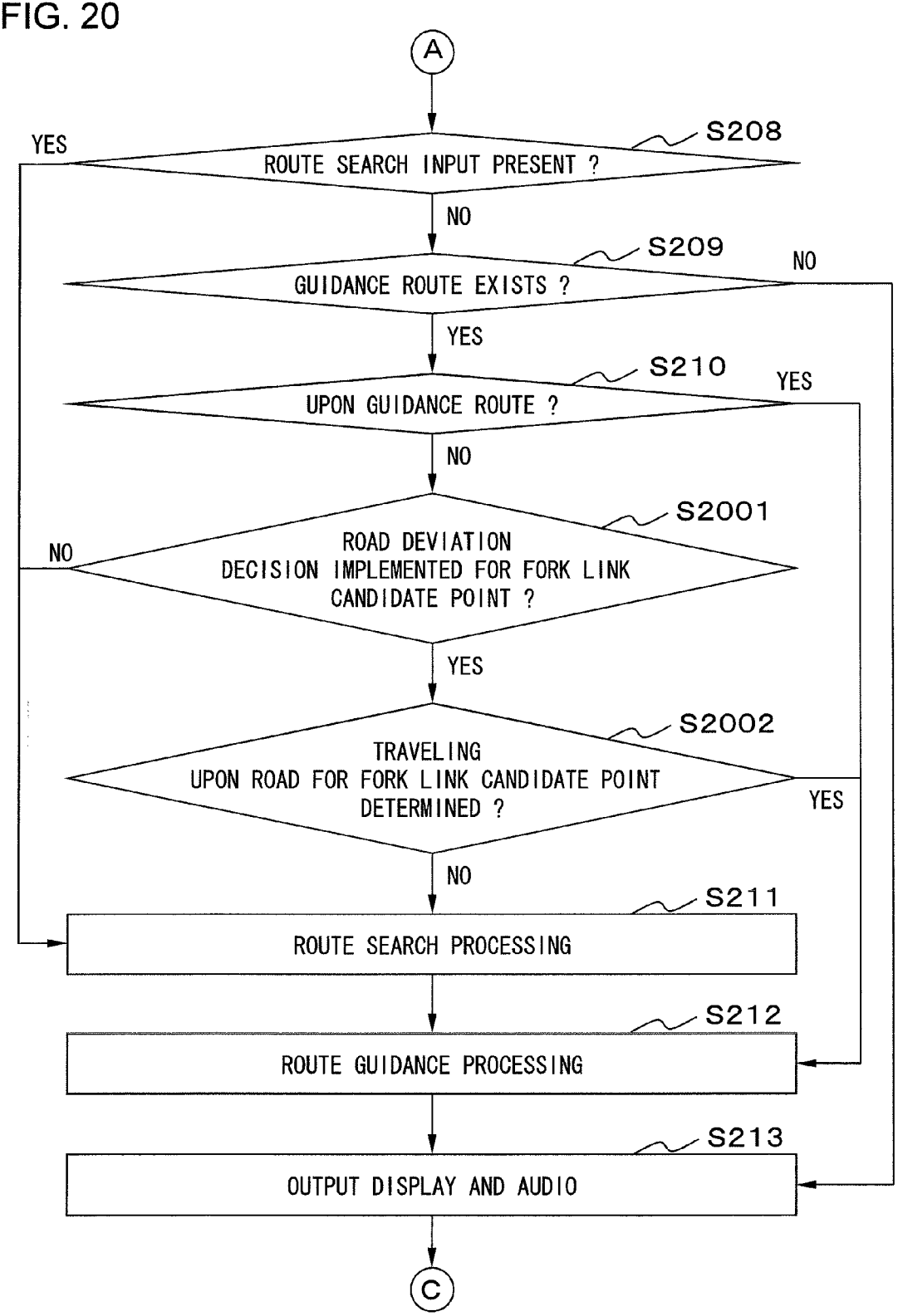
FIG. 20 is a figure showing operation of a position calculation apparatus for processing to implement route searching.

In concrete terms, instead of the step S413 and the step S409 of the operational procedure of the position calculation apparatus 100 shown in FIG. 1 (refer to FIG. 3), along with performing the processing shown in FIGS. 14 and 15, in the operational procedure (see FIG. 2) of the position calculation apparatus 100 shown in FIG. 1, the processing of steps S2001 and S2002 is inserted between the step S210 and the step S211. Since the processing of the steps S208 through S210 and the processing of the steps S211 through S213 have been described above with reference to FIG. 2, only the steps S2001 and S2002 that are newly inserted between the step S210 and the step S211 will be explained in the following description with reference to FIG. 20.

In the step S2001, a decision is made as to whether or not the fork link candidate point road deviation decision has been implemented. If the road deviation decision for the fork link candidate point has been implemented in the road deviation decision of the steps S1901 through S1904 shown in FIG. 14, then the flow of control proceeds to the step S2002. But if it has not been implemented, then the flow of control is transferred to the step S211.

In the step S2002, a decision is made as to whether or not road traveling was determined upon in the fork link candidate point road deviation decision. If in the road deviation decision of the steps S1901 through S1904 shown in FIG. 14 it was decided that the vehicle is traveling upon the road for the fork link candidate point, then the flow of control proceeds to the step S212. But if road deviation is determined, then the flow of control is transferred to the step S211.

(8) With the position calculation apparatus 100 shown in FIG. 1, it would also be possible to remove the acceleration sensor device 104. Then, in the operational procedure shown in FIG. 2, in the step S202, no signal corresponding to the acceleration of the position calculation apparatus 100 would be sent to the sensor output correction device 111 or processed. And, in the step S203, no processing would be performed for calculating the sensor acceleration by subtracting a bias of the acceleration sensor device 104 from the output from the acceleration sensor device 104. Moreover, in the step S205, in Equation (1), the terms corresponding to the pitch $\phi(t)$ would be deleted from the state quantity vector $\eta(t)$, the matrixes F and G, the state transition matrix $\Phi(\Delta t, \alpha a, \alpha \omega)$, and Q(k), and the terms corresponding to the sensor acceleration gs(t) would be deleted from the observation quantity vector y, the matrix H, and the observation noise matrix R. By doing this, it would be possible to reduce the number of sensors, and thus to reduce the cost of the device.

(9) With the position calculation apparatus 100 shown in FIG. 1, it would also be acceptable to remove the speed sensor device 102, the angular velocity sensor device 103, the acceleration sensor device 104, and the sensor output correction device 111. Then, in the operational procedure shown in FIG. 2, the step S202 and the step S203 are deleted, and, in the step S204, the reception anomaly determination device 112 receives the reception position, the reception speed, and the reception azimuth from the reception device 101. The position change over a predetermined time period is calculated from the reception speed and the reception azimuth, and, if the difference between this position change and the change of the reception position in the predetermined time period becomes greater than or equal to a threshold value, then it is decided that there is an anomaly in the reception position, while if this is not the case, it is decided that the reception position is normal. It is supposed that the reception speed and the reception azimuth are always normal. Since it is necessary to renew the estimated position and the estimated azimuth in the position measurement processing of the step S205, accordingly it is always necessary to input some information. Here, the reception speed and the reception azimuth are always inputted. The reception position is inputted when it has been determined to be normal. Moreover, in the step S205, in Equation (1), along with deleting the terms corresponding to the pitch $\phi(t)$ from the state quantity vector $\eta(t)$, the matrixes F and G, the state transition matrix $\phi(\Delta t, \alpha a, \alpha \omega)$, and Q(k), also the terms corresponding to the sensor speed vs(t), the sensor angular velocity $\omega s(t)$, and the sensor acceleration gs(t) are deleted from the observation quantity vector y, the matrix H, and the observation noise matrix R. By doing this, it is possible to reduce the number of sensors and the amount of calculation processing, and thus to reduce the cost of the device.

(10) By mounting the position calculation apparatus 100 to a car navigation system, it is possible to implement a car navigation system that can determine correctly whether or not the vehicle has deviated from the road, even though the link errors in the maps are different for each region and for each map maker. Moreover even if, after a road fork at a narrow angle, the subject vehicle is matched to an erroneous link, still this car navigation system is capable of quickly returning to the correct link.

(11) With the position calculation apparatus 100 shown in FIG. 1, it would also be acceptable, for each predetermined region, to arrange to calculate in advance both the variances related to the errors in the link positions and also the variances related to the errors in the link azimuths, and to store them in the map accuracy storage device 108. It would be possible to draw the road links as superimposed upon an aerial photograph from an artificial satellite or an aircraft, and then it would be possible to calculate in advance the variances related to the errors in the link positions and the variances related to the errors in the link azimuths based upon deviations of the positions of the links from this photograph. Or it would also be acceptable to arrange to calculate the errors in the link positions and the errors in the link azimuths by actually making the vehicle travel along the links, in other words by making the mobile object shift along them, and then each of these error variances could be calculated in advance using the results of these calculations. By doing this, in the operational procedure (refer to FIGS. 2, 3, and 7), it would become unnecessary to execute the step S207 each time operation is performed. In this case, it would not be necessary to store the count number, the summed value, and the summed value of sums of squares for each of the predetermined regions in the map accuracy storage device 108.

Figure 8:
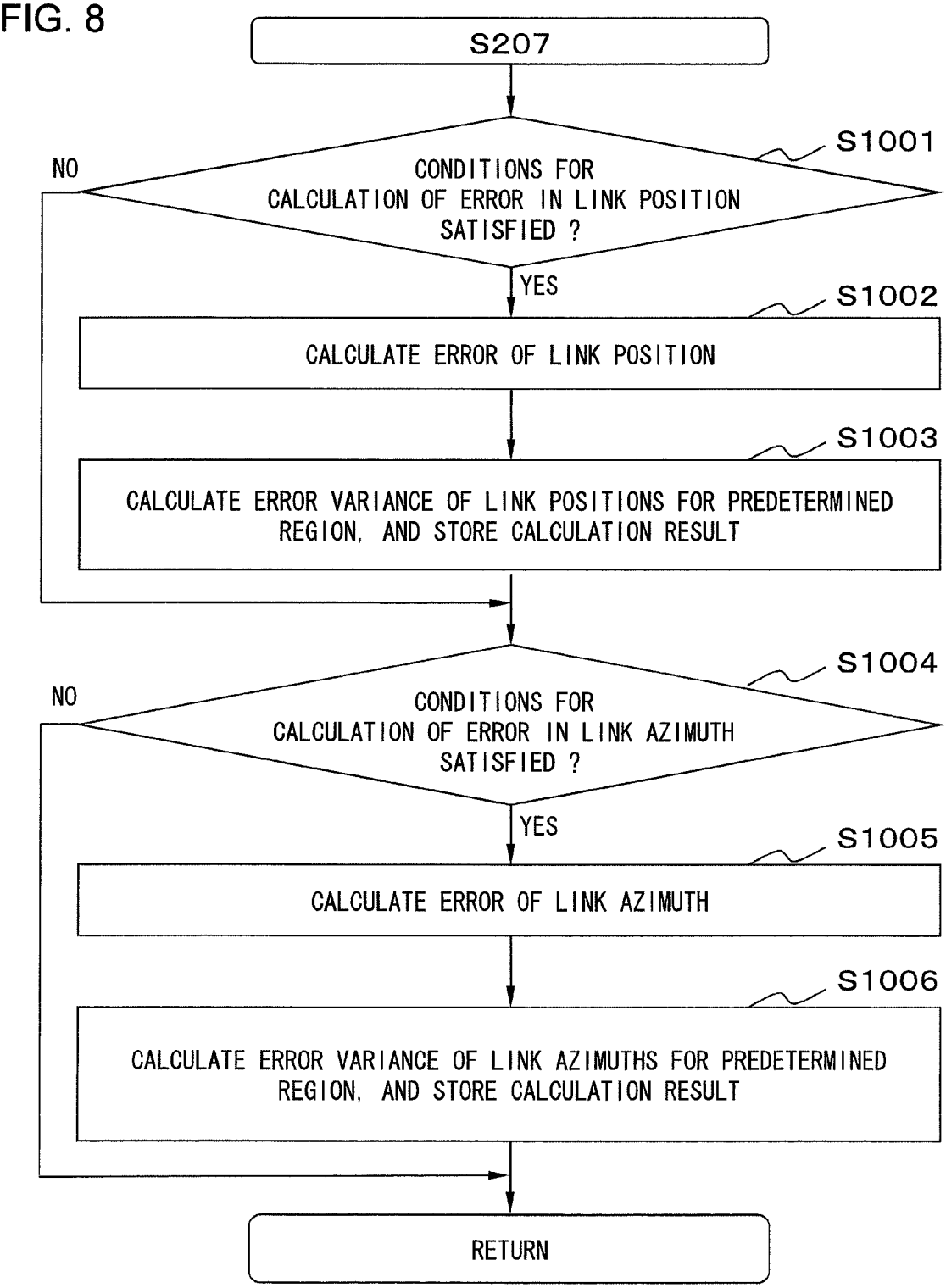
FIG. 8 is a figure showing operation of the position calculation apparatus for map accuracy calculation processing.

Furthermore it would also be acceptable to arrange, after having previously stored the variances related to the errors in the link positions and the errors in the link azimuths in the map accuracy storage device 108 in advance, further to execute the processing of the step S207 of FIG. 8 as well. By doing this, it would be possible to calculate the error variances of the errors in the link positions and the errors in the link azimuths based upon the actual results of map matching, and to update the values stored in the map accuracy storage device 108.

It would also be acceptable for variances of the errors of link positions and errors in azimuths for each predetermined region calculated in advance to be used in the steps S410 and S413. It is possible to perform both the calculation of the evaluation values for the link candidate points in the step S410 and also the road deviation decision in the step S413 by doing this. Due to this, it is possible to ensure that the evaluation values for the link candidate points and the test statistics for road deviation do not experience any influence from errors in the link data in the map, these being different for every region and for every map maker, and thus it is possible to reduce errors in the matching and errors in the road deviation decision.

(12) The embodiment and variant embodiments described above may also be combined in various ways.

While various embodiments and variant embodiments have been explained in the above description, the present invention is not to be considered as being limited by the details thereof. Other modes that are considered as being within the range of the technical idea of the present invention are also included within the scope of the present invention.

The content of the disclosure of the following base application, upon which priority is claimed, is hereby incorporated herein by reference:

Japanese Patent Application 2011-87237 (filed on Apr. 11, 2011).

The invention claimed is:
1. A position calculation method, comprising:
providing a reception device that receives a position measurement signal emitted from a position measurement satellite, and a measurement device that measures sensor data including at least one of a speed, an angular velocity and an acceleration of a mobile object;

calculating, by a processor, a current position, a shifting speed and an azimuth of movement of the mobile object;

calculating, by the processor, an estimated error covariance of the current position and the azimuth of movement based upon the current position, the shifting speed and the azimuth of movement;

calculating, by the processor, an evaluation value that corresponds to a probability that the mobile object is traveling upon a road corresponding to each link candidate point of a plurality of link candidate points included in a predetermined region that includes the current position, for each link including the each link candidate point, wherein the evaluation value is calculated using the current position, the azimuth of movement, the estimated error covariance, a link candidate point position of the each link candidate point, a link candidate point azimuth of the each link candidate point, a first error variance of positions of a plurality of links included in the region, and a second error variance of azimuths of the plurality of links, the evaluation value is calculated based upon a distance between the current position and the link candidate point position and based upon an azimuthal difference between the azimuth of movement and the link candidate point azimuth, and the evaluation value is calculated by adding together a plurality of data items including the distance and the azimuthal difference obtained at each of predetermined intervals up to the link candidate point position;

calculating, by the processor, the current position based upon the evaluation value, by taking the mobile object as being positioned at a link candidate point, among the plurality of link candidate points, for which the probability is highest; and outputting guidance information to a display and audio device based on calculations performed by the processor;

wherein:

the processor calculates the current position the shifting speed and the azimuth of movement based upon the position measurement signal and the sensor data; and the processor calculates the estimated error covariance using the position measurement signal and the sensor data.

2. A position calculation method according to claim 1, wherein:

the first error variance is calculated based upon the distance;

the second error variance is calculated based upon the azimuthal difference; and the evaluation value is obtained by summing, over the plurality of data items, a sum of a value obtained by dividing a square of the distance included in each of the plurality of data items by a sum of the first error variance and an estimated error variance of the current position, and a value obtained by dividing a square of the azimuthal difference included in the each of the plurality of data items by a sum of the second error variance and an estimated error variance of the azimuth of movement.

3. A position calculation method according to claim 1, further comprising:

making, based upon whether or not a first test statistic that is related to a distance between the current position and the link candidate point position for which the probability is the highest is greater than a first threshold value, a decision as to whether or not there is a difference between the current position and the link candidate point position;

making, based upon whether or not a second test statistic that is related to an azimuthal difference between the azimuth of movement and the link candidate point azimuth for which the probability is the highest is greater than a second threshold value, a decision as to whether or not there is a difference between the azimuth of movement and the link candidate point azimuth, and, when there is a difference between the current position and the link candidate point position or when there is a difference between the azimuth of movement and the link candidate point azimuth, making a decision that the mobile object has deviated from the road corresponding to the link candidate point for which the probability is the highest, and, when there is no difference between the current position and the link candidate point position and there is no difference between the azimuth of movement and the link candidate point azimuth, making a decision that the mobile object is traveling upon the road corresponding to the link candidate point for which the probability is the highest;

wherein, when it has been decided that the mobile object has deviated from the road corresponding to the link candidate point for which the probability is the highest, it is calculated that the mobile object is positioned at the current position, and, when it has been decided that the mobile object is traveling upon the road corresponding to the link candidate point for which the probability is the highest, the current position is calculated as the mobile object is positioned at the link candidate point.

4. A position calculation method according to claim 3, further comprising:

when it has been decided that the mobile object has not deviated from the road corresponding to the link candidate point for which the probability is the highest, making a decision as to whether or not to calculate the first error variance, according as to whether or not the estimated error covariance is less than or equal to a third threshold value; and, when it has been decided that the mobile object has not deviated from the road corresponding to the link candidate point for which the probability is the highest, making a decision as to whether or not to calculate the second error variance, according as to whether or not the estimated error covariance is less than or equal to a fourth threshold value.

5. A position calculation method according to claim 3, further comprising:

calculating a DOP value from a satellite position of a position measurement satellite and the current position; and making a decision as to whether or not the current position is anomalous and as to whether or not the azimuth of movement is anomalous, based upon change in the current position, change in the shifting speed and change in the azimuth of movement, wherein, when it has been decided that the mobile object has not deviated from the road corresponding to the link candidate point for which the probability is the highest and it has been decided that the current position is not anomalous, the decision is made as to whether or not to calculate the first error variance, according as to whether or not the DOP value is less than or equal to a fifth threshold value; and when it has been decided that the mobile object has not deviated from the road corresponding to the link candidate point for which the probability is the highest, and it has been decided that the current position is not anomalous, the decision is made as to whether or not to calculate the second error variance, according as to whether or not the DOP value is less than or equal to the fifth threshold value.

6. A position calculation method according to claim 3, wherein
the values of the first test statistic and the second test statistic are each a value that is obtained by making dimensionless and totaling a value that is obtained by dividing a square of the distance between the current position and the link candidate point position for which the probability is the highest by a sum of error covariances of the current position and of the link candidate point position for which the probability is the highest, and a value that is obtained by dividing a square of the azimuthal difference between the azimuth of movement and the link candidate point azimuth for which the probability is the highest by a sum of error variances of the azimuth of movement and of the link candidate point azimuth for which the probability is the highest.

7. A position calculation method according to claim 3, wherein:
the first test statistic is a value obtained by dividing a square of the distance between the current position and the link candidate point position for which the probability is the highest by a sum of error covariances of the current position and of the link candidate point position for which the probability is the highest; and
the second test statistic is a value obtained by dividing a square of the azimuthal difference between the azimuth of movement and the link candidate point azimuth for which the probability is the highest by a sum of error variances of the azimuth of movement and the link candidate point azimuth for which the probability is the highest.

8. A position calculation method according to claim 1, wherein,
when a first link and a second link that constitute the plurality of links fork off from a road fork point node and the link candidate point for which the probability is the highest is included in the first link, a number of data items in the plurality of data items is reduced from when the mobile object passes through an intersection that corresponds to the road fork point node until a gap between the link candidate point position of the link candidate point and a road section corresponding to the second link becomes greater than a predetermined value.

9. A position calculation method according to claim 1, wherein
a number of data items in the plurality of data items is reduced during a first interval from when the mobile object passes through an intersection that corresponds to a road fork point node from which a first link and a second link that constitute the plurality of links fork off, until it is decided that the mobile object is traveling along a road that corresponds to a link including a link candidate point that is different from the link candidate point for which the probability is the highest.

10. A position calculation method according to claim 9, further comprising:
if the mobile object is being guided along a guidance route from a start point link closest to the current position to an end point link closest to a destination for the mobile object and if a link that includes the link candidate point for which the probability is the highest is included in the guidance route, and it is decided that the mobile object has not deviated from the road and the distance between the intersection and the link candidate point position of the link candidate point has become less than or equal to a predetermined value, outputting a display for guidance and guidance audio related to the guidance route to a display and an audio output device; and,
if the mobile object is being guided based upon the guidance route and if the link that includes the link candidate point for which the probability is the highest is not included in the guidance route, and if the mobile object passes through the intersection and it is decided that the mobile object has deviated from the road that corresponds to a link including a link candidate point that is different from the link candidate point for which the probability is the highest, searching a new guidance route from the start point link closest to the current position to the end point link closest to the destination for the mobile object.

11. A position calculation apparatus, comprising:
a reception device that receives a position measurement signal emitted from a position measurement satellite; and
a measurement device that measures sensor data including at least one of a speed, an angular velocity and an acceleration of a mobile object;
a memory; and
a processor coupled to the memory, wherein the processor:
calculates a current position, a shifting speed, and an azimuth of movement of the mobile object;
calculates an estimated error covariance of the current position and the azimuth of movement based upon the current position, the shifting speed and the azimuth of movement, and calculates the estimated error covariance using the position measurement signal and the sensor data;
calculates, as a calculation using the current position, the azimuth of movement, the estimated error covariance, a link candidate point position of each link candidate point of a plurality of link candidate points included in a predetermined region that includes the current position, a link candidate point azimuth of the each link candidate point, a first error variance of positions of the plurality of links included within the region and a second error variance of azimuths of the plurality of links, based upon a distance between the current position and the link candidate point position and based upon the azimuthal difference between the azimuth of movement and the link candidate point azimuth, by adding together a plurality of data items including the distance and the azimuthal difference obtained at each of predetermined intervals up to the link candidate point position, an evaluation value that corresponds to a probability that the mobile object is traveling upon a road corresponding to the each link candidate point, for each link including the each link candidate point;
calculates the current position, the shifting speed and the azimuth of movement based upon the position measurement signal and the sensor data, and calculates the current position based upon the evaluation value, by taking the mobile object as being positioned at a link candidate point, among the plurality of link candidate points, for which the probability is highest; and
outputs guidance information to a display and audio device based on calculations performed by the processor.

12. A position calculation apparatus according to claim 11, wherein the processor calculates the first error variance based upon the distance and calculates the second error variance based upon the azimuthal difference; and calculates the evaluation value by summing, over the plurality of data items, a sum of a value obtained by dividing a square of the distance included in each of the plurality of data items by a sum of the first error variance and an estimated error variance of the current position, and a value obtained by dividing a square of the azimuthal difference included in the each of the plurality of data items by a sum of the second error variance and an estimated error variance of the azimuth of movement.

13. A position calculation apparatus according to claim 11, wherein the processor makes a decision, based upon whether or not a value that is obtained by dividing a square of a distance between the current position and the link candidate point position of the link candidate point for which the probability is the highest by a sum of the first error variance and an estimated error variance of the current position, is greater than a first threshold value, as to whether or not there is a difference between the current position and the link candidate point position;

makes a decision, based upon whether or not a value that is obtained by dividing an azimuthal difference between the azimuth of movement and the link candidate point azimuth of the link candidate point for which the probability is the highest by a square root of a sum of the second error variance and an estimated error variance of the azimuth of movement, is greater than a second threshold value, as to whether or not there is a difference between the azimuth of movement and the link candidate point azimuth; and when there is a difference between the current position and the link candidate point position or when there is a difference between the azimuth of movement and the link candidate point azimuth, makes a decision that the mobile object has deviated from the road corresponding to the link candidate point for which the probability is the highest and, when there is no difference between the current position and the link candidate point position and there is no difference between the azimuth of movement and the link candidate point azimuth, makes a decision that the mobile object is traveling upon the road corresponding to the link candidate point for which the probability is the highest;

wherein, when it has been decided that the mobile object has deviated from the road corresponding to the link candidate point for which the probability is the highest, the processor calculates that the mobile object is positioned at the current position and, when it has been decided that the mobile object is traveling along the road corresponding to the link candidate point for which the probability is the highest, the processor calculates the current position of the mobile object as being positioned at the link candidate point.

14. A position calculation apparatus according to claim 11, wherein when a first link and a second link that constitute the plurality of links fork off from a road fork point node and the link candidate point for which the probability is the highest is included in the first link, the processor sets a number of data items in the plurality of data items so as to be reduced, from when the mobile object passes through an intersection that corresponds to the road fork point node until a gap between the link candidate point position of the link candidate point and a road section corresponding to the second link becomes greater than a predetermined value.

* * * * *